(12) United States Patent  (10) Patent No.: US 7,418,183 B2
Wittmeier et al.  (45) Date of Patent: Aug. 26, 2008

(54) FIBER OPTIC SPLICE ENCLOSURE

(75) Inventors: David A. Wittmeier, Evanston, IL (US); Wade K. Fournier, Spring Grove, IL (US); Jeffrey A. Plesniak, Plainfield, IL (US); Walter Harwood, Streamwood, IL (US); Carney P. Claunch, II, Rolling Meadows, IL (US)

(73) Assignee: Charles Industries, Ltd., Rolling Meadows, IL (US)

( * ) Notice: Subject to any disclaimer, the term of this patent is extended or adjusted under 35 U.S.C. 154(b) by 0 days.

(21) Appl. No.: 11/654,189

(22) Filed: Jan. 17, 2007

(65) Prior Publication Data

US 2007/0183732 A1  Aug. 9, 2007

Related U.S. Application Data

(60) Provisional application No. 60/771,248, filed on Feb. 8, 2006.

(51) Int. Cl.
*G02B 6/00* (2006.01)

(52) U.S. Cl. ........................................ 385/135; 385/134

(58) Field of Classification Search ................... 385/135
See application file for complete search history.

(56) References Cited

U.S. PATENT DOCUMENTS

| | | | |
|---|---|---|---|
| 4,913,522 A | | 4/1990 | Nolf et al. |
| 4,927,227 A | * | 5/1990 | Bensel et al. ............... 385/135 |
| 5,097,529 A | | 3/1992 | Cobb et al. |
| 5,127,082 A | | 6/1992 | Below et al. |
| 5,133,038 A | | 7/1992 | Zipper |
| 5,155,794 A | | 10/1992 | Nolf et al. |
| 5,249,253 A | | 9/1993 | Franckx et al. |
| 5,255,337 A | * | 10/1993 | Theys et al. ................. 385/135 |
| 5,261,024 A | * | 11/1993 | Allen et al. ................. 385/135 |
| 5,278,933 A | * | 1/1994 | Hunsinger et al. .......... 385/135 |
| 5,509,099 A | * | 4/1996 | Hermsen et al. ............ 385/134 |
| 5,553,186 A | * | 9/1996 | Allen ......................... 385/135 |

(Continued)

OTHER PUBLICATIONS

Colored photographs of Emerson Fiber Pedestals; 1 p., Aug. 2004.

(Continued)

*Primary Examiner*—Frank G Font
*Assistant Examiner*—Ryan Lepisto
(74) *Attorney, Agent, or Firm*—Leydig, Voit & Mayer, Ltd.

(57) ABSTRACT

A fiber optic splice enclosure for housing an interconnection contained in a splice tray between at least one optical fiber of a feeder cable and at least one optical fiber of a drop cable is provided. The optical fiber of the feeder cable is at least partially contained in a feeder cable buffer or transportation tube. The fiber optic splice enclosure includes a support frame arranged in the enclosure. The support frame includes a central office side and a drop side. A basket is arranged on the support frame for storing slack of a spliced buffer tube transitioning to the splice tray. The spliced storage arrangement is sized so as to be able to store slack of the spliced feeder cable buffer tube while maintaining a predetermined tube bend radius. A splice tray mounting arrangement is arranged on the drop side of the support frame for supporting the splice tray.

38 Claims, 24 Drawing Sheets

U.S. PATENT DOCUMENTS

| | | | |
|---|---|---|---|
| 5,602,954 | A | 2/1997 | Nolf et al. |
| 5,617,501 | A * | 4/1997 | Miller et al. ................. 385/134 |
| 5,734,776 | A * | 3/1998 | Puetz .......................... 385/134 |
| 5,764,844 | A | 6/1998 | Mendes |
| 5,774,618 | A | 6/1998 | Jones |
| 5,956,449 | A | 9/1999 | Otani et al. |
| 6,014,490 | A | 1/2000 | Canning et al. |
| 6,167,183 | A | 12/2000 | Swain |
| 6,226,436 | B1 | 5/2001 | Daoud et al. |
| 6,253,016 | B1 | 6/2001 | Daoud |
| 6,275,641 | B1 | 8/2001 | Daoud |
| 6,292,614 | B1 | 9/2001 | Smith et al. |
| 6,304,707 | B1 * | 10/2001 | Daems et al. ................ 385/135 |
| 6,411,767 | B1 | 6/2002 | Burrous et al. |
| 6,434,313 | B1 | 8/2002 | Clapp, Jr. et al. |
| 6,453,107 | B1 | 9/2002 | Daoud |
| 6,483,977 | B2 | 11/2002 | Battey et al. |
| 6,493,501 | B2 | 12/2002 | Flores et al. |
| 6,496,640 | B1 | 12/2002 | Harvey et al. |
| 6,539,160 | B2 | 3/2003 | Battey et al. |
| 6,542,688 | B1 | 4/2003 | Battey et al. |
| 6,560,394 | B1 | 5/2003 | Battey et al. |
| 6,621,975 | B2 | 9/2003 | Laporte et al. |
| 6,678,457 | B2 | 1/2004 | Kim et al. |
| 6,766,094 | B2 | 7/2004 | Smith et al. |
| 6,778,752 | B2 | 8/2004 | Laporte et al. |
| 6,901,200 | B2 | 5/2005 | Schray |
| 6,916,985 | B1 | 7/2005 | Harwood |
| 7,038,127 | B2 | 5/2006 | Harwood |
| 7,045,710 | B1 * | 5/2006 | Allen et al. ..................... 174/50 |
| 7,274,850 | B2 * | 9/2007 | Wittmeier et al. ............ 385/135 |
| 2002/0051616 | A1 * | 5/2002 | Battey et al. ................. 385/135 |
| 2003/0223725 | A1 * | 12/2003 | Laporte et al. .............. 385/135 |
| 2005/0175307 | A1 | 8/2005 | Battey et al. |
| 2005/0189133 | A1 | 9/2005 | Harwood |
| 2005/0207711 | A1 | 9/2005 | Vo et al. |
| 2006/0029351 | A1 * | 2/2006 | Lapp ........................... 385/135 |
| 2006/0193587 | A1 * | 8/2006 | Wittmeier et al. ............ 385/135 |
| 2006/0193588 | A1 * | 8/2006 | Mertesdorf et al. .......... 385/135 |
| 2006/0263029 | A1 * | 11/2006 | Mudd et al. .................. 385/135 |
| 2007/0154159 | A1 * | 7/2007 | Kowalczyk et al. ......... 385/135 |

OTHER PUBLICATIONS

Colored photographs of Channel Fiber Pedestals, 3 pp., Jan. 2006.
Colored photographs of Channel Fiber Pedestals, 2 pp., Aug. 2004.
CESI Homedome FTTX Pedestal product brochure; 6 pp. (Applicants became aware of around Mar. 2006).
ADC Telecommunications, Inc., OmniReach™ FTTX Solutions 8" Non-Metallic-Fiber Access Terminal product specification; 4 pp., Feb. 2006—Original © 2004.
Corning Cable Systems LLC, OptiDrop™ Premier Fiber Pedestal with 4-Port MultiPort, Splice Trays and Slack Storage product specification; 2 pp., Feb. 2006.
Corning Cable Systems LLC, OptiTap™ Connector An Evolant® Solutions Product product specification; 2 pp., Sep. 2005.
Corning Cable Systems LLC, OptiTap™ Hybrid Adapter (OptiTap/SC APC) An Evolant® Solutions Product product specification; 2 pp., Sep. 2005.
Emerson Network Power Energy Systems, North America, Inc., NetSpan™ Integrated Fiber Distribution Terminal Solutions product specification; 4 pp., © 2006.
ADC Telecommunications, Inc., OmniReach™ 12-Inch Fiber Access Terminal Installation Instructions technical publication; 36 pp, ADCP-96-027 Issue 1, Apr. 2005.
AFL Telecommunications a Fujikura Business, Fiber Apparatus—LightLink™ LL-400 Optical Splicing and Distribution Enclosures; 2 pp., © 2002 and 2005 (revised Oct. 11, 2005 and and Jan. 20, 2006).

* cited by examiner

FIBER OPTIC SPLICE ENCLOSURE

CROSS-REFERENCE TO RELATED APPLICATIONS

This patent application claims the benefit of U.S. Provisional Patent Application No. 60/771,248, filed Feb. 8, 2006.

FIELD OF THE INVENTION

This invention pertains to enclosures for housing optical fiber interconnections at distribution points in a fiber optic network.

BACKGROUND OF THE INVENTION

There is an ever-increasing demand for high-speed or high-bandwidth communication channels for delivering high-speed data and video services. To meet this demand, telecommunications service providers are developing networks (sometimes referred to as outside plant networks) that extend the higher bandwidth of fiber optic components all the way to the end-user businesses and homes (referred to as premises). In such networks, there are distribution points where a distribution, feeder or branch cable is interconnected with one or more drop cables that are routed to the premises. At such distribution points, the side coming from the service provider is generally referred to as the central office or CO side while the side leading to the premises is generally referred to as the drop side. A distribution, branch or feeder cable typically includes a sheath surrounding a plurality of buffer tubes with each buffer tube housing a plurality of optical fibers.

Enclosures are used to house fiber optic cable interconnections and splices and certain fiber optic components (e.g., splitters and couplers) at various locations in a fiber optic network. Existing fiber optic enclosures, however, are not well suited for use at distribution points close to the end-user premises. Technicians will have to access the interior of the enclosures at such distribution points on a fairly regular basis to add new splices for the premises of additional subscribers or to disconnect service to subscribers canceling service. Vault-type enclosures that are buried in the ground are one type of enclosure commonly used in fiber optic networks. Such vaults are thought to be necessary to protect the integrity of the optical fibers and splices. However, to gain access to the splices in the vault, a bulky lid with multiple bolts must be removed and a sealed splice case, also with multiple fasteners and cable sealing provisions, removed from the interior of the vault. As a result, accessing and servicing such vaults is time-consuming, and thus expensive, making them unsuitable for use at distribution points close to premises that will have to be accessed by technicians on a regular basis.

In addition, performing splicing operations in the field can also be very awkward when working with buried vault enclosures. In particular, when the sealed splice case is removed, lengthy slack fiber loops must also be removed from the vault so that the splice case can reach a clean area where the splicing can be performed. Once the splice case is situated in the clean splicing area, actually gaining access to the splices can sometimes involve the removal of over a dozen threaded fasteners. Once the splicing operation is completed, these steps must be performed in reverse order to replace the splice case back in the vault. Failure to properly reseal the cable openings and tighten the fasteners often results in water leakage into the splice case that may cause undesirable optical signal degradation.

The routing and management of the fiber optic cables in such vaults can also lead to problems. For example, with such vaults, there is a significant risk that a technician will disrupt the unopened buffer tubes (known as "express buffer tubes") that extend in an uninterrupted manner through the vault in the course of performing the splicing operation. Obviously, this issue is of particular significance when the vault is being used at a distribution point to premises that will have to be accessed frequently for field splicing operations. The cable routing and management in such vaults can also be quite complicated further increasing the potential for errors by technicians performing work on the equipment in the vault.

Other types of enclosures used in fiber optic networks have similar issues and drawbacks. For instance, despite being installed above-ground, accessing the interior of many pedestal-type enclosures can be quite awkward. Removal and replacement of the cover on the pedestal is a particular problem. Moreover, many pedestal enclosures have complicated cable management systems. These enclosures are also relatively inflexible in their set-up making them difficult or impossible to optimize for the needs of a specific application.

BRIEF SUMMARY OF THE INVENTION

The invention provides a fiber optic splice enclosure for housing an interconnection contained in a splice tray between at least one optical fiber of a feeder cable and at least one optical fiber of a drop cable. The optical fiber of the feeder cable is at least partially contained in a feeder cable buffer or transportation tube. The fiber optic splice enclosure includes a support frame arranged in the enclosure. The support frame includes a central office side and a drop side. A basket is arranged on the support frame for storing slack of a spliced buffer tube transitioning to the splice tray. The spliced storage arrangement is sized so as to be able to store slack of the spliced feeder cable buffer tube while maintaining a predetermined tube bend radius. The basket has at least one wall and is open on the drop side of the support frame. The basket wall has at least one opening therein through which the feeder cable buffer tube can be routed from the central office side of the enclosure into the basket. A splice tray mounting arrangement is arranged on the drop side of the support frame for supporting the splice tray.

The invention further provides a fiber optic splice enclosure including a support frame arranged in the enclosure and a dome that is removably positionable over the support frame. A resiliently flexible snap tab is arranged on the support frame. The snap tab is insertable in and engageable with an opening on the dome so as to secure the dome on the support frame.

The invention further provides a fiber optic splice enclosure including a support frame arranged in the enclosure. A plurality of hinge elements are arranged on opposed lateral edges of the support frame for receiving doors. A resiliently flexible snap tab is arranged on the support frame for securing a dome on the support frame.

The invention further provides a fiber optic splice enclosure including a support frame arranged in the enclosure. A plurality of cable attachment elements are arranged on the support frame for securing cables to the support frame. At least one of the cable attachment elements is removably attachable to the support frame.

The invention further provides a fiber optic splice enclosure for housing an interconnection in a splice tray between at least one optical fiber of a feeder cable and at least one optical fiber of a drop cable. The fiber optic splice enclosure includes a support frame arranged in the enclosure. A splice tray mounting arrangement is arranged on the support frame for supporting a plurality of splice trays. A splice tray hinge part is snap engageable with the splice tray mounting arrangement so as to be attachable thereto and detachable therefrom. The splice tray hinge part includes a plurality of spaced pairs of journal openings for receiving complementary posts carried by a splice tray such that splice tray is pivotable relative to the splice tray mounting arrangement.

The invention further provides a fiber optic splice enclosure including a support frame arranged in the enclosure. The support frame includes a central office side and a drop side. A first weather tight door is carried by the support frame for enclosing the drop side of the support frame. A bulkhead is arranged on the central office side of the enclosure. A barrier is arranged on the central office side of the enclosure. The bulkhead and barrier define an enclosed area on the central office side of the enclosure. A plurality of connector adaptors are carried by the bulkhead. The connector adaptors each include a rugged, sealed connector that extends through the bulkhead to outside the enclosed area defined by the bulkhead and barrier for mating with a mating connector carried by a feeder cable.

DETAILED DESCRIPTION OF THE INVENTION

Figure 1:
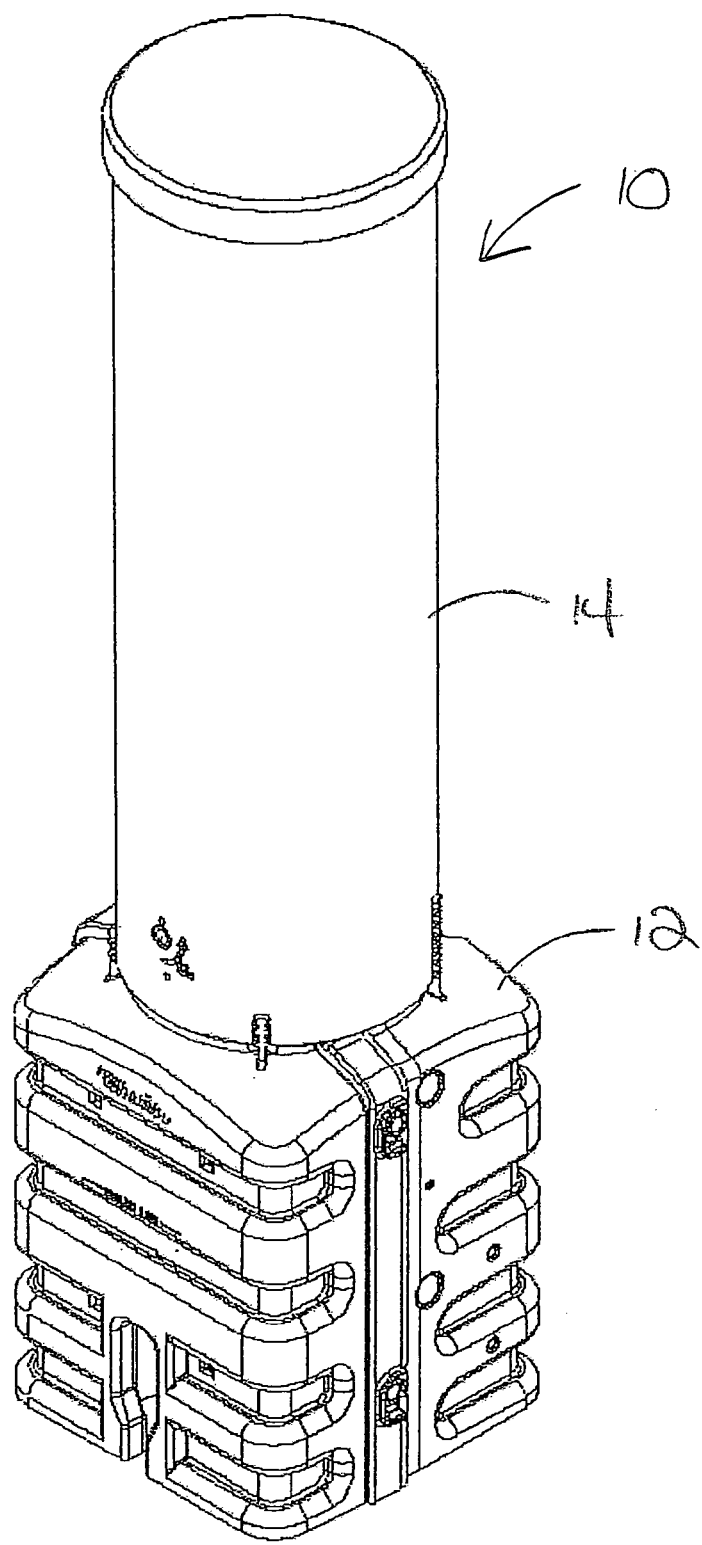
FIG. 1 is a front perspective view of an exemplary fiber optic splice enclosure according to the present invention.

Referring now to FIG. 1 of the drawings, there is illustrated an exemplary fiber optic splice enclosure 10 constructed in accordance with the teachings of the present invention. The illustrated fiber optic splice enclosure 10 has a pedestal configuration that includes a base section 12 and a cover or dome 14. In this case, the cover 14 nests in a telescoping fashion over the base section 12 so as to define an interior space within the enclosure 10 that can house fiber optic splice connections and other telecommunications equipment. Inside the enclosure 10, the splices and other equipment are protected against damage from water, fire, wind-blown dust and debris and impact. When in-use, at least a portion of the base section 12 is typically filled with dirt and/or gravel and buried in the ground. Fiber optic cables can be fed into the interior space of the splice enclosure 10 through one or more openings in the base section 12.

The use of the pedestal configuration for the fiber optic splice enclosure 10 offers several important advantages over other structures such as vaults. For instance, the pedestal configuration provides technicians with 360° access to the interior space of the enclosure for performing maintenance and installation work. The pedestal configuration also provides a bell-jar effect, which results in superior flood protection as compared to other types of enclosures. Preferably, the base and cover 12, 14 of the splice enclosure 10 are made of non-metallic materials such as plastics that will not rust, corrode, chip or fade. While a non-metallic pedestal type configuration offers several advantages, those skilled in the art will appreciate that the present invention is not limited to enclosures having any particular size or configuration or to enclosures that are made of any particular material.

The fiber optic splice enclosure 10 of the present invention is particularly suited for fiber to the premises (FTTP) applications. In such applications, a fiber optic splice enclosure is fed by a fiber optic feeder cable in communication with equipment at the service provider and one or more fiber optic drop cables that are routed to premises (e.g., homes or businesses). As noted above, the side coming from the service provider is generally referred to as the central office or CO side (referenced generally as 33 in the drawings) while the side leading to the premises is generally referred to as the drop side (referenced generally as 35 in the drawings). The fiber optic feeder cables and the fiber optic drop or branch cables typically comprise a sheath surrounding a plurality of buffer tubes with each buffer tube housing a plurality of optical fibers either loosely or in a ribbon configuration. In the enclosure, at least some of the optical fibers of the feeder cable are spliced or otherwise interconnected to optical fibers of the branch or drop cables while other optical fibers and their associated buffer tubes or other ribbon fibers extend uninterrupted through the enclosure. The buffer tubes containing the unspliced optical fibers are generally referred to as express buffer tubes. As used herein, the term buffer tubes will also encompass uncovered ribbon fibers as well as ribbon fibers sheathed in transportation tubes. Moreover, as used herein the term drop cable shall also encompass branch cables. In the drawings, the feeder cables are generally identified by reference number 15, the drop cables are identified by reference number 17 and the express buffer tubes are identified by reference number 19. For clarity purposes, the drawings generally only show a single feeder cable and/or a single drop cable, however, it will be understood by those skilled in the art that the fiber optic splice enclosure of the present invention could be used in situations involving multiple feeder cables and/or multiple drop cables.

In the illustrated embodiment, the base section 12 has a generally rectangular configuration. This rectangular configuration allows the enclosure 10 to be substantially self-supporting (i.e., supported without any mounting stakes or other mounting hardware) in the ground. In this case, the walls of the base section 12 also have a corrugated configuration that both increases their strength and allows the dirt or gravel to better infiltrate around the base section making the base section harder to remove from the ground.

Figure 2:
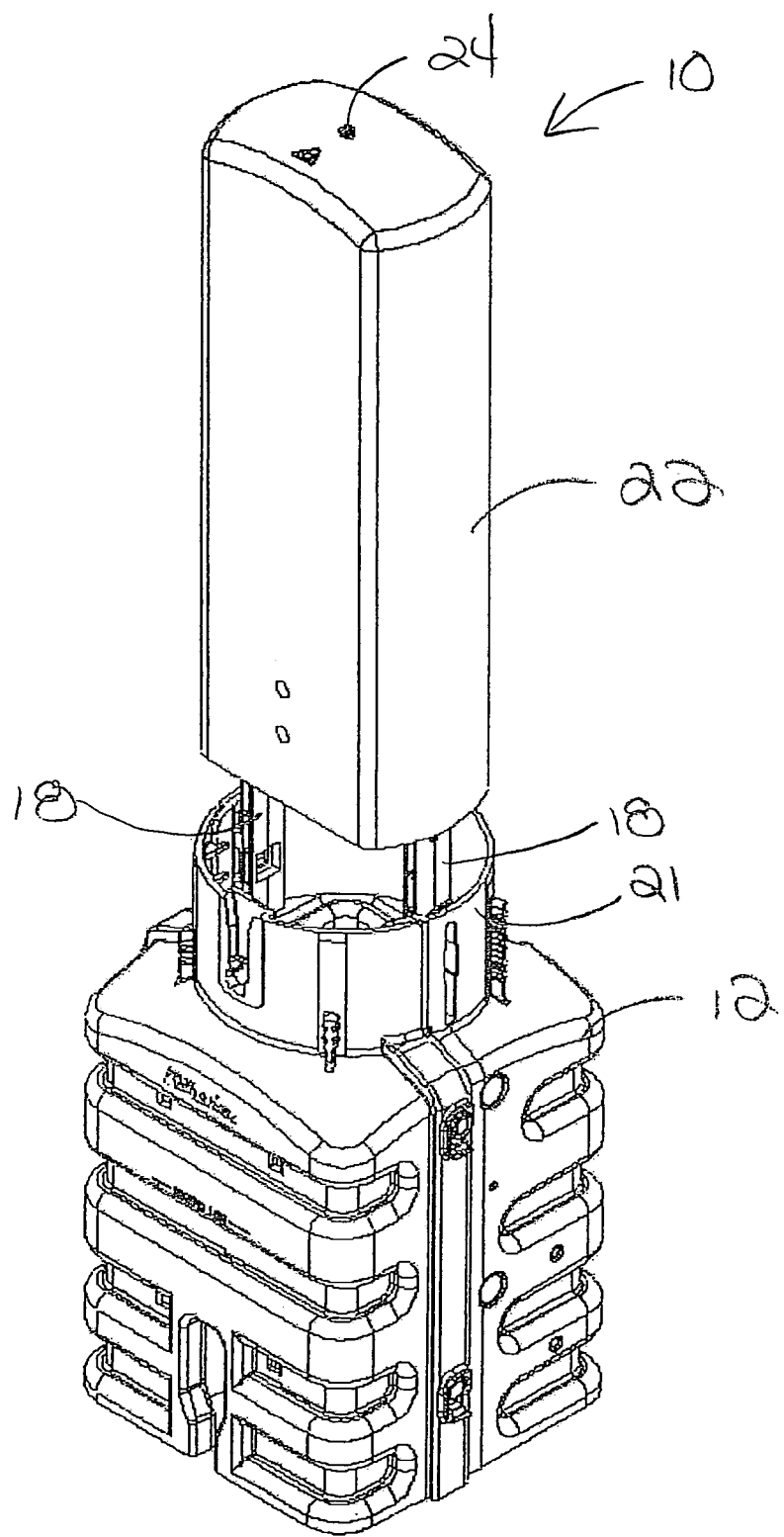
FIG. 2 is a front perspective view of the fiber optic splice enclosure of FIG. 1 with the outer cover removed to expose an inner dome.

To enable the base section 12 to mate with standard generally cylindrical covers that are in common use in the telecommunications industry, the rectangular base section includes a cylindrical neck 21 (see FIG. 2). In order to facilitate repair or replacement of the fiber optic cables or other equipment associated with the fiber optic splice enclosure as well as to facilitate rehabbing of older enclosures, the base section 12 can have a split configuration. Specifically, the base section 12 can include mating front and rear housings that can be selectively separated from each other even after the fiber optic splice enclosure has been installed in the field without disturbing the contents of the enclosure 10.

Figure 3:
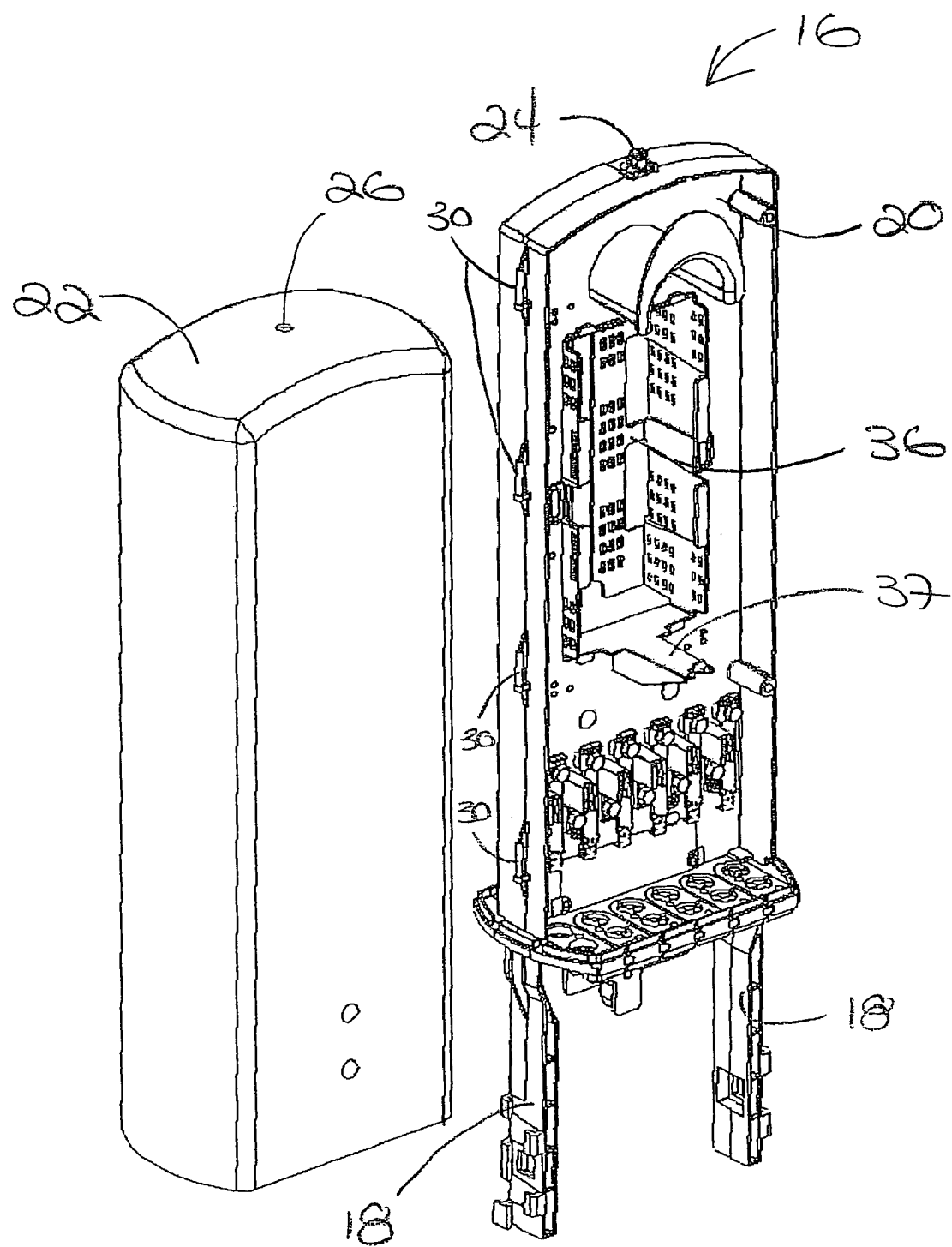
FIG. 3 is a front perspective view of the internal support frame and inner dome of the fiber optic splice enclosure of FIG. 1.

To support and organize the optical fiber feeder and drop cables 15, 17 and the associated buffer tubes, optical fibers and splices along with any other telecommunications equipment housed in the fiber optic splice enclosure 10, the illustrated enclosure includes an internal support frame 16 as shown in FIG. 3. The internal support frame 16 includes a plurality of legs 18 that support a backboard 20 with each leg being connected to the base section 12 of the enclosure (see, e.g., FIG. 18). The backboard 20 is configured with discrete central office 33 (see FIG. 10) and drop sides 35 (see FIG. 9) each of which has a distinct configuration. Having discrete central office and drop sides 33, 35 facilitates separation of the splicing to the central office feeder cable and the splicing to homes or offices which can be particularly useful in situations where different technicians perform the splicing on the central office and drop sides.

As desired, a mounting arrangement that permits quick and easy mounting and removal of the internal support frame 16 to and from the base section 12 without the use of any tools can be utilized. With such a mounting arrangement, the lower ends of the legs 18 of the internal frame 16 are simply slid onto complementary mounting parts provided on the base section 12 and automatically locked into position. The internal frame 16 can then be removed simply by manually releasing a locking mechanism from engagement with the internal frame. Additional details regarding such a mounting arrangement can be found in commonly owned, U.S. Pat. No. 7,038,127 entitled "Universal Mounting Arrangement For Components Of An Electronics Enclosure," the disclosure of which is incorporated herein by reference.

To provide the fiber optic and/or other telecommunications equipment supported on the backboard 20 with additional protection against inclement weather conditions such as wind driven dust, rain and snow, the enclosure 10 can have an internal dome or alternatively inner doors that cover the backboard. As shown in FIGS. 2-3, the internal dome 22 can comprise an elongated cylinder having a closed upper end and an open lower end so that it can be placed over the top of the internal support frame 16. The internal dome 22 should be long enough so that when it is installed it substantially covers the backboard 20 and sized so that the external cover or dome 14 can be put in place over it. In this case, the internal dome 22 has a rectangular cross-sectional shape, however, it will be understood that other shapes could also be used.

Figure 4:
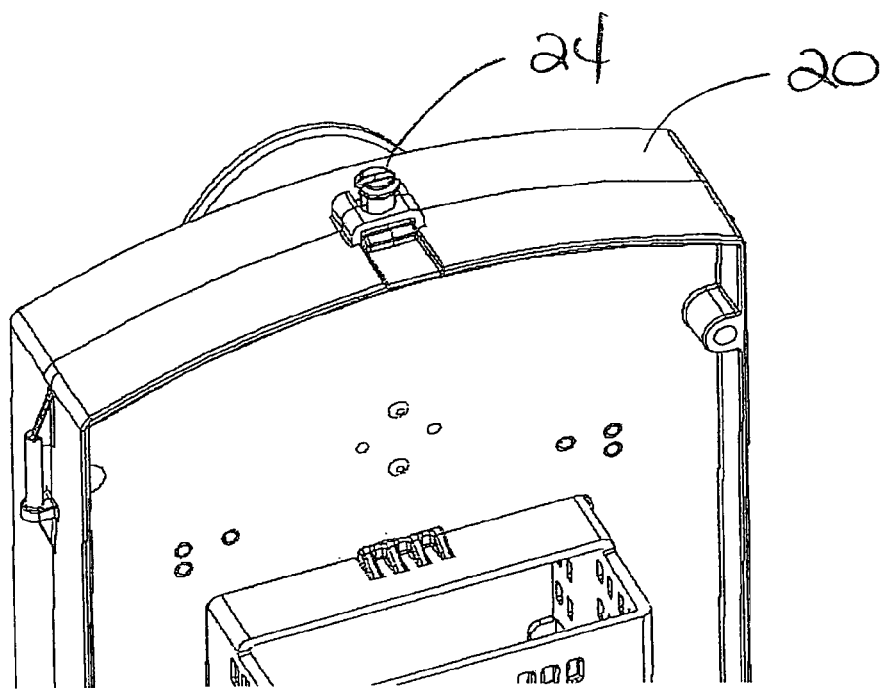
FIG. 4 is a partial top perspective view of the top of the internal support frame of the fiber optic splice enclosure of FIG. 1.
Figure 5:
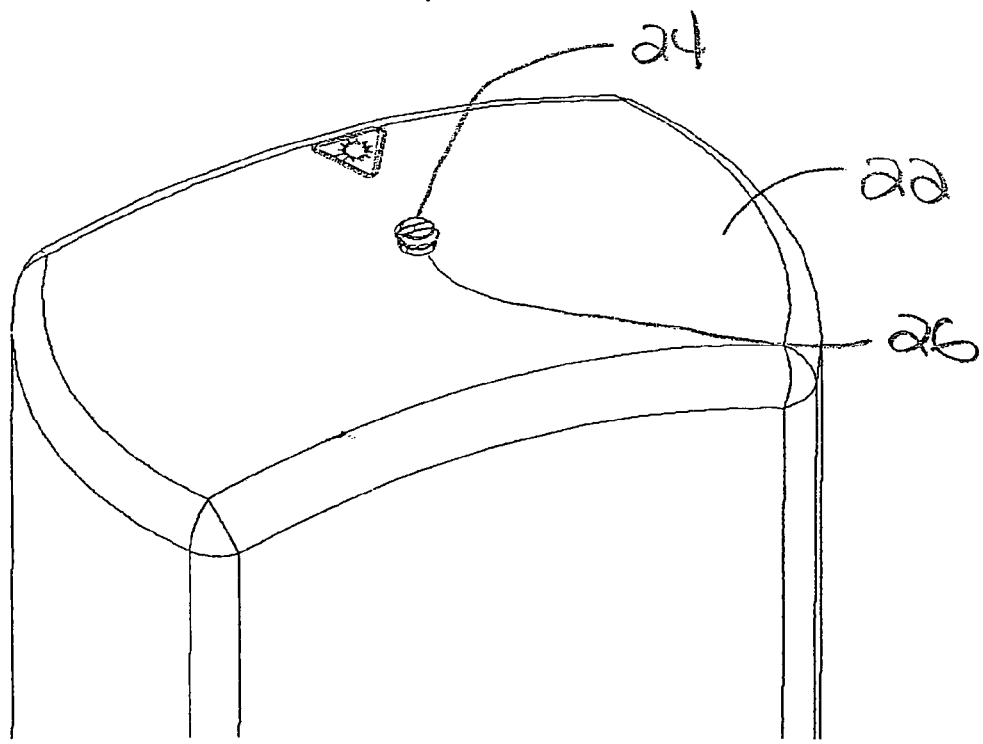
FIG. 5 is a partial top perspective view of the inner dome of the fiber optic splice enclosure of FIG. 1 showing the engagement of the inner dome with the top of the internal support frame.

To permit the internal dome 22 to be installed more quickly and easily over the internal support frame, a snap tab 24 can be provided on the support frame 16 that automatically engages the internal dome 22 when it is properly positioned without the need for any auxiliary fasteners such as bolts or the like. As shown in FIGS. 3 and 4, the snap tab 24 in the illustrated embodiment extends upward from the upper edge of the backboard 20. In this case, the tab 24 has a generally cylindrical configuration with an enlarged head and is split down the middle to allow the two sides of the tab to flex radially inward and outward. A complementary hole 26 is provided in the top wall of the inner dome 22 as shown in FIG. 3. Once the internal dome 22 is lowered over the support frame 17, the snap tab 24 is aligned with and then inserted into the hole 26. As the snap tab is inserted in the hole, the two sides flex radially inward to allow the enlarged head of the tab to pass through the opening. Once the enlarged head passes through the hole 26, the sides of the snap tab 24 flex back outward so that tab is engagement with the hole 26 as shown in FIG. 5. The rectangular cross-sectional configuration of the internal dome 22 ensures that the internal dome is installed in the proper orientation with respect to the internal support frame 16. Additionally, the engagement of the lateral edges of the backboard 20 with the sides of the internal dome 22 assists in the alignment of the hole 26 in the dome with the snap tab 24. The auto-alignment and auto-engagement features of the fiber optic slice enclosure allow the internal dome to be installed quickly and easily without any fumbling around for the attachment hole.

Figure 6:
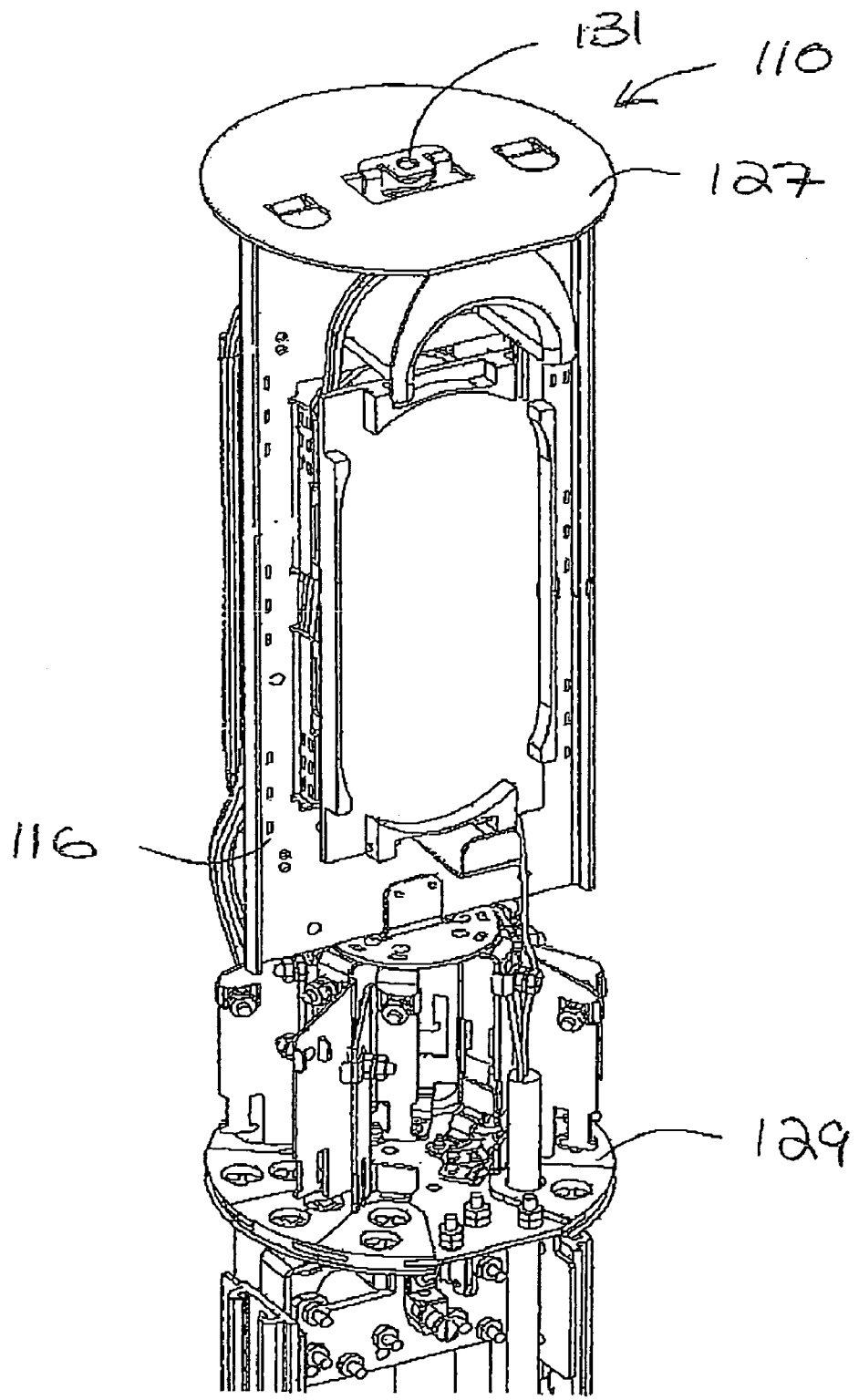
FIG. 6 is a perspective view of an alternative embodiment of an internal support frame that is configured to help align a dome with a generally circular cross-section.

An alternative arrangement for assisting with the alignment of a dome on an internal support frame is shown in FIG. 6. The embodiment of FIG. 6 is particularly configured for a dome with a more circular cross-sectional configuration. In this embodiment, the internal support frame 116 has a generally circular halo portion 127 at its upper end. A generally circular footer portion 129 is also provided below the internal support frame 116. The halo and footer portions 127, 129 help ensure that the dome (not shown) aligns properly with the internal support frame 116. When the dome and internal support frame are properly aligned, a hole in the dome aligns with an attachment hole 131 at the upper end of the internal support frame 116. In the illustrated embodiment, a bolt or other attachment hardware can be used to secure the dome to the support frame or alternatively a snap tab like that of FIGS. 3-5 can be used.

Figure 7:
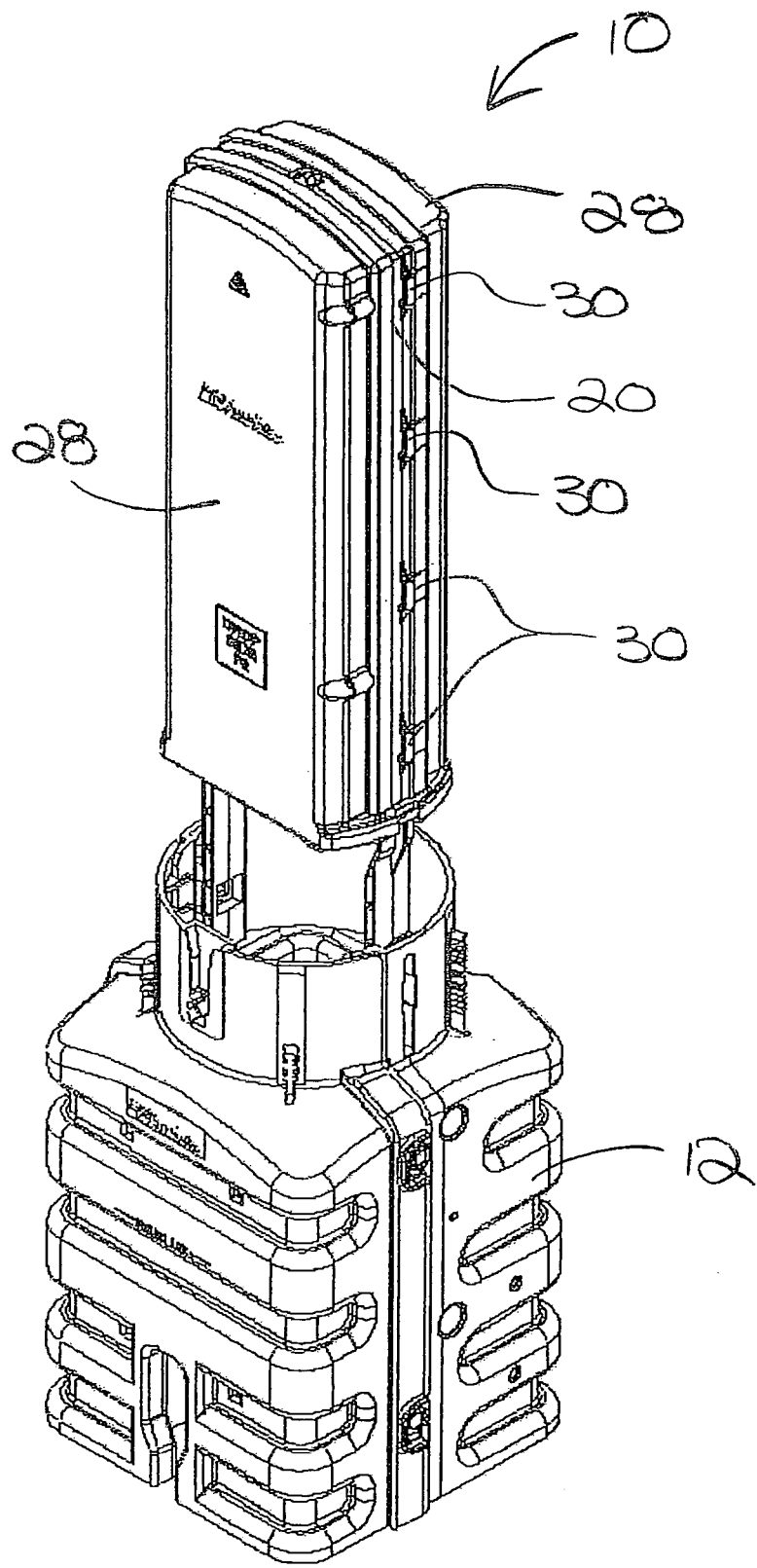
FIG. 7 is a front perspective view of an alternative embodiment of a fiber optic splice enclosure according to the present invention in which the outer cover is removed to expose interior doors.

As opposed to using an internal dome, additional weather protection for the fiber optic equipment supported on the backboard can be provided by inner doors. For example, in the embodiment shown in FIGS. 7 and 8, each side of the backboard 20 has its own weather tight door 28. In this case, each door 28 is connected via hinge elements 30 to one edge of the backboard 20 for movement between an open position (FIG. 8), wherein a technician can access the cables, buffer tubes and splices on the respective side of the enclosure, and a closed position (FIG. 7) where the respective side of the enclosure is sealed. If desired, each door 28 can be keyed to guard against unauthorized entry. Additionally, the hinge elements 30 can be configured to allow each door 28 to be removed from the backboard to allow better access and freedom for the technician to work.

Figure 8:
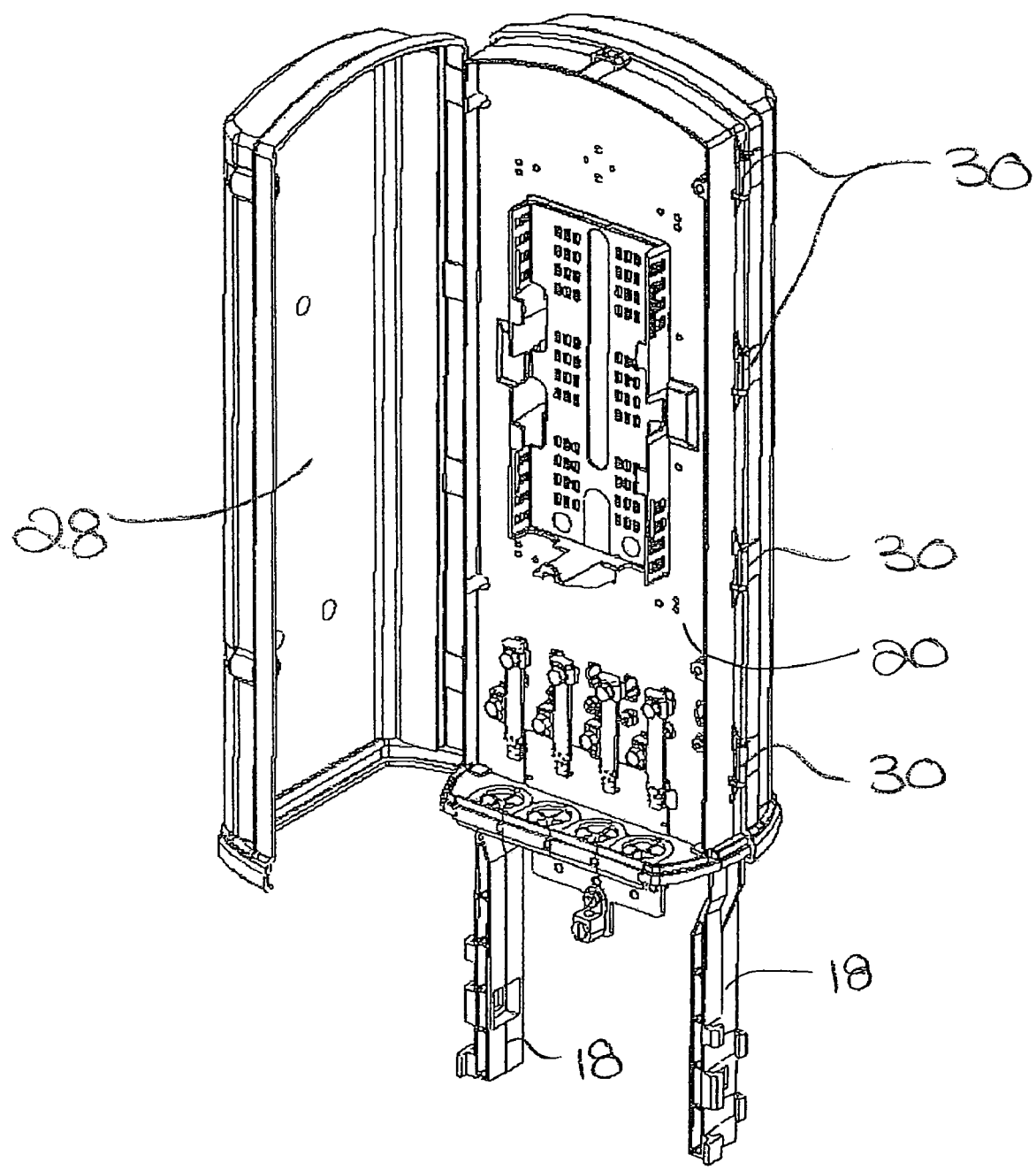
FIG. 8 is a front perspective view of the internal support frame of the fiber optic splice enclosure of FIG. 7 showing the central office side of the backboard with one of the inner doors open.
Figure 9:
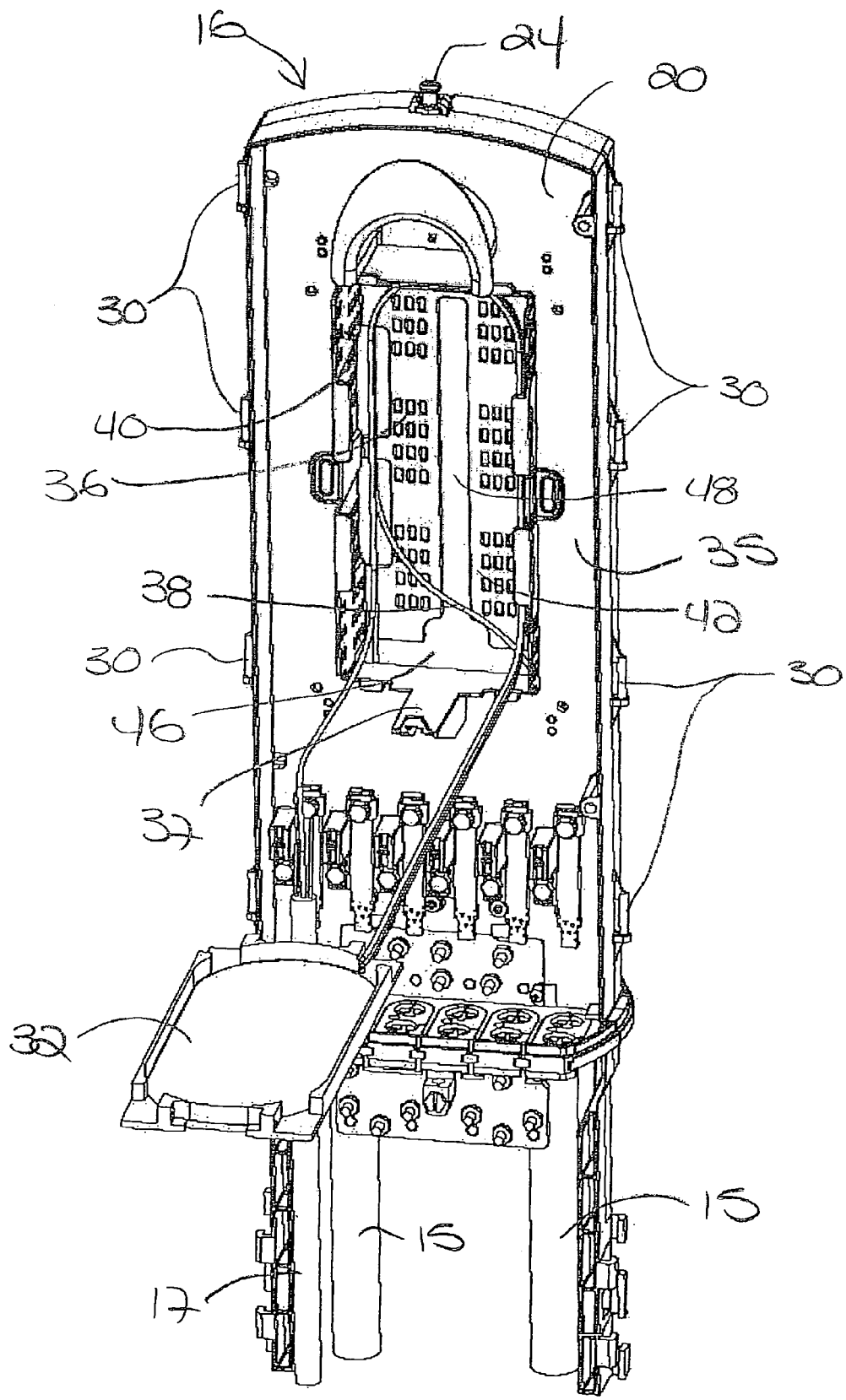
FIG. 9 is a front perspective view of the internal support frame of FIG. 3 showing the drop side of the backboard with the inner door removed and a splice tray detached and pulled away from the internal support frame.

To simplify the manufacturing, the internal support frames 16 can have a common modular construction that can be readily adapted for different configurations of the splice enclosure 10. For example, the internal support frame 16 can be constructed so that the same support frame can be used with either an internal dome 22 or doors 28. To this end, as shown in FIGS. 3, 8 and 9, the support frame includes a plurality of hinge elements 30 on each lateral edge of the backboard 20 as well as a snap tab 24 on the upper edge of the backboard 20. With this internal support frame 16, as desired, inner doors 28 can be hung on the hinges (see FIG. 8) or an internal dome 22 can be used which engages the snap tab 24 (see FIG. 3). Thus, there is no need to provide differently configured support frames for the version of the enclosure with the internal dome and the version of the enclosure with inner doors. As will be appreciated, this greatly simplifies manufacturing.

Figure 15:
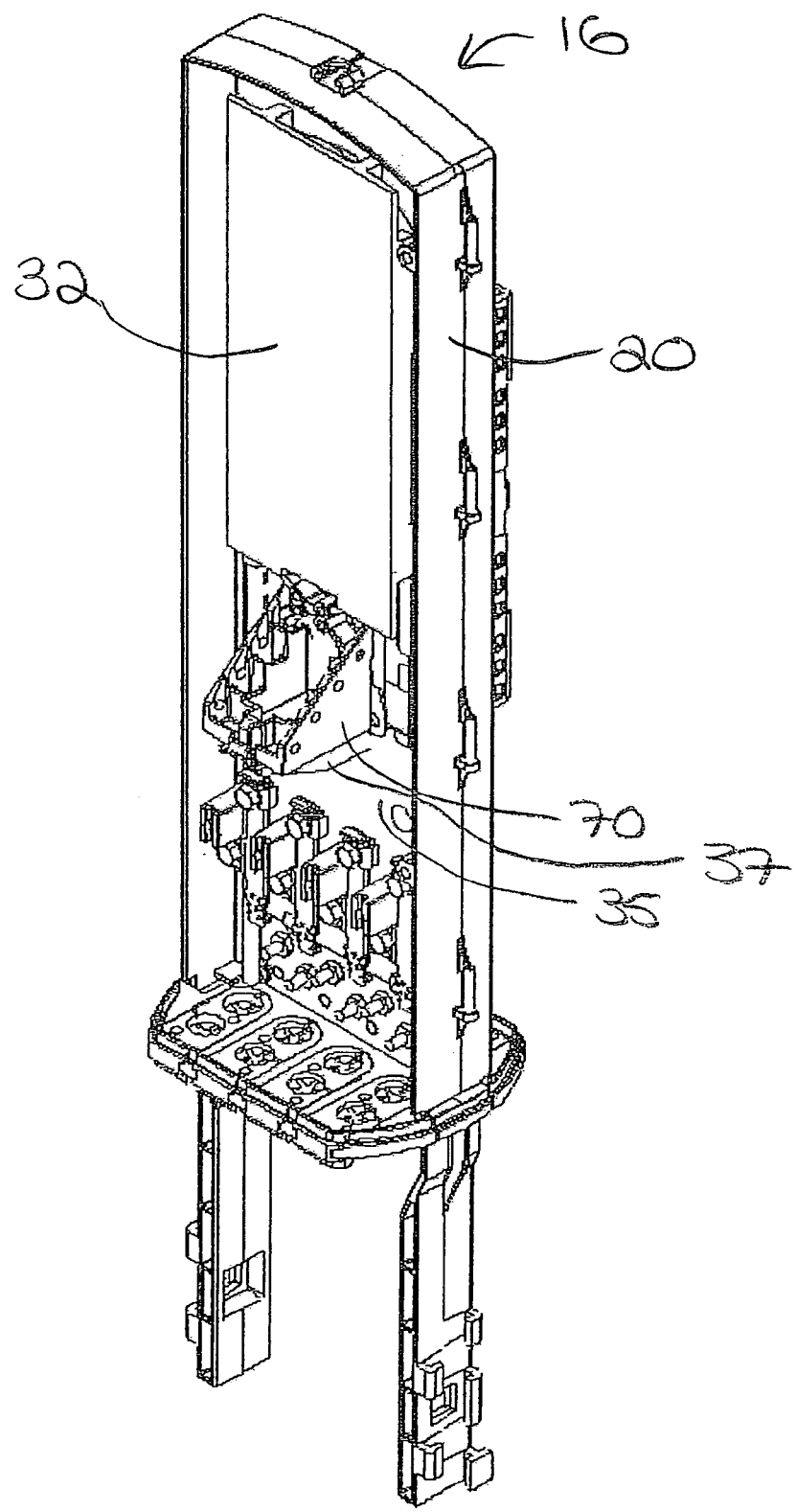
FIG. 15 is a front perspective view of an alternative embodiment of an internal support frame for a fiber optic splice enclosure according to the present invention which includes a splice tray hinge part.

For housing interconnections or splices between respective pairs of optical fibers from the feeder cable 15 and the drop cables 17 and fiber optic passive components such as splitters or couplers and protecting such splices and equipment from damage, one or more splice trays 32 are removably mountable on the internal support frame 16 of the enclosure (the splice trays are shown mounted in FIG. 15). In this case, the splice trays 32 are mountable in a generally central location on the drop side 35 of the backboard 20 of the support frame 16 such that they are easily accessible by field technicians for removal for a field splicing operation. As best shown in FIGS. 2 and 4, the backboard 20 further includes a splice tray support 37 that cantilevers outward from the backboard so as to provide a ledge on which the lower edges of the splice trays 32 can rest.

Each of the splice trays 32 is secured in position on the support frame 16 so that it cannot shift or otherwise move in a manner that would damage the optical fiber interconnections. The splice trays 32 can be secured in position using any suitable mounting technique. For instance, a hook and loop strap, that wraps around the trays 32 can be used. Alternatively or additionally, the backboard can include one or more posts that are insertable in openings on the splice trays 32. With such an arrangement, the end of the posts can be threaded so that a threaded fastener can then be applied to the end of the post to secure the splice trays 32 in position on the posts.

To facilitate organization of the spliced buffer tubes and optical fibers and the express buffer tubes and optical fibers as well as ensure efficient utilization of the interior space of the enclosure, the internal support frame 16 includes several tube/fiber organizing features. One such feature is a structure or basket 36 for storing or containing the buffer tubes from the feeder cables and drop cables that include the optical fibers which are spliced together in the splice trays (these "spliced buffer tubes" are identified by reference number 38 in the drawings). In particular, on the side of each splice tray 32 connected to the feeder cable buffer tubes and the side of each splice tray connected to the drop cable buffer tubes, lengthy slack buffer tube loops must be provided to allow the splice tray to be detached and pulled away from the internal support frame 16 for splicing operations (see, e.g., FIG. 9). These spliced buffer tube slack loops 38 can be stored in the spliced slack storage basket 36 where they are kept separate from the express buffer tubes 19 that extend in an uninterrupted manner (i.e., unspliced) through the fiber optic splice enclosure 10. The spliced slack storage basket 36 provides a clear demarcation between the spliced buffer tubes 38 and the express buffer tubes 19 substantially simplifying management of the cables and buffer tubes.

Figure 10:
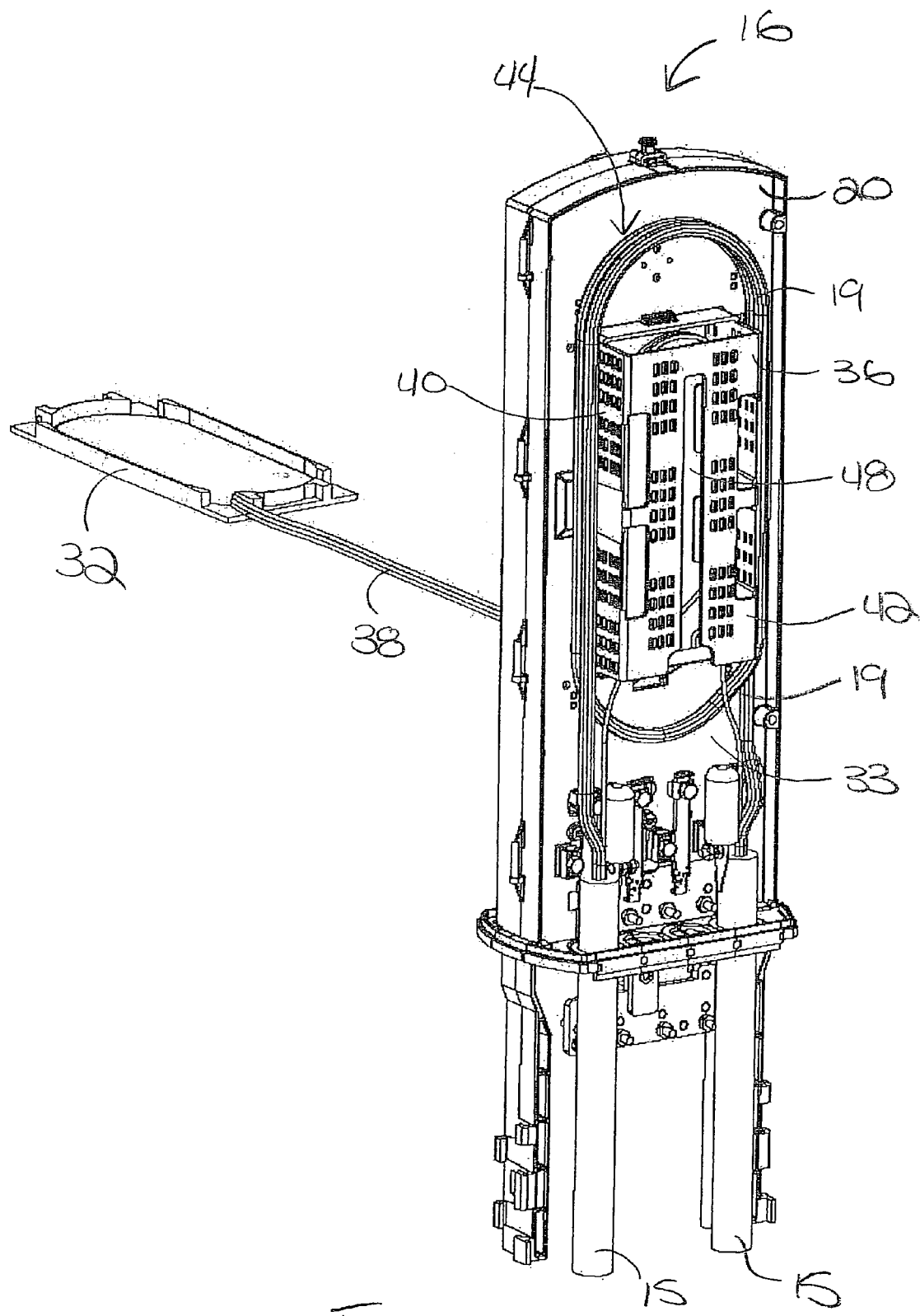
FIG. 10 is a rear perspective view of the internal support frame of FIG. 3 showing the central office side of the backboard with the inner door removed and the splice tray detached and pulled away from the internal support frame.
Figure 12:
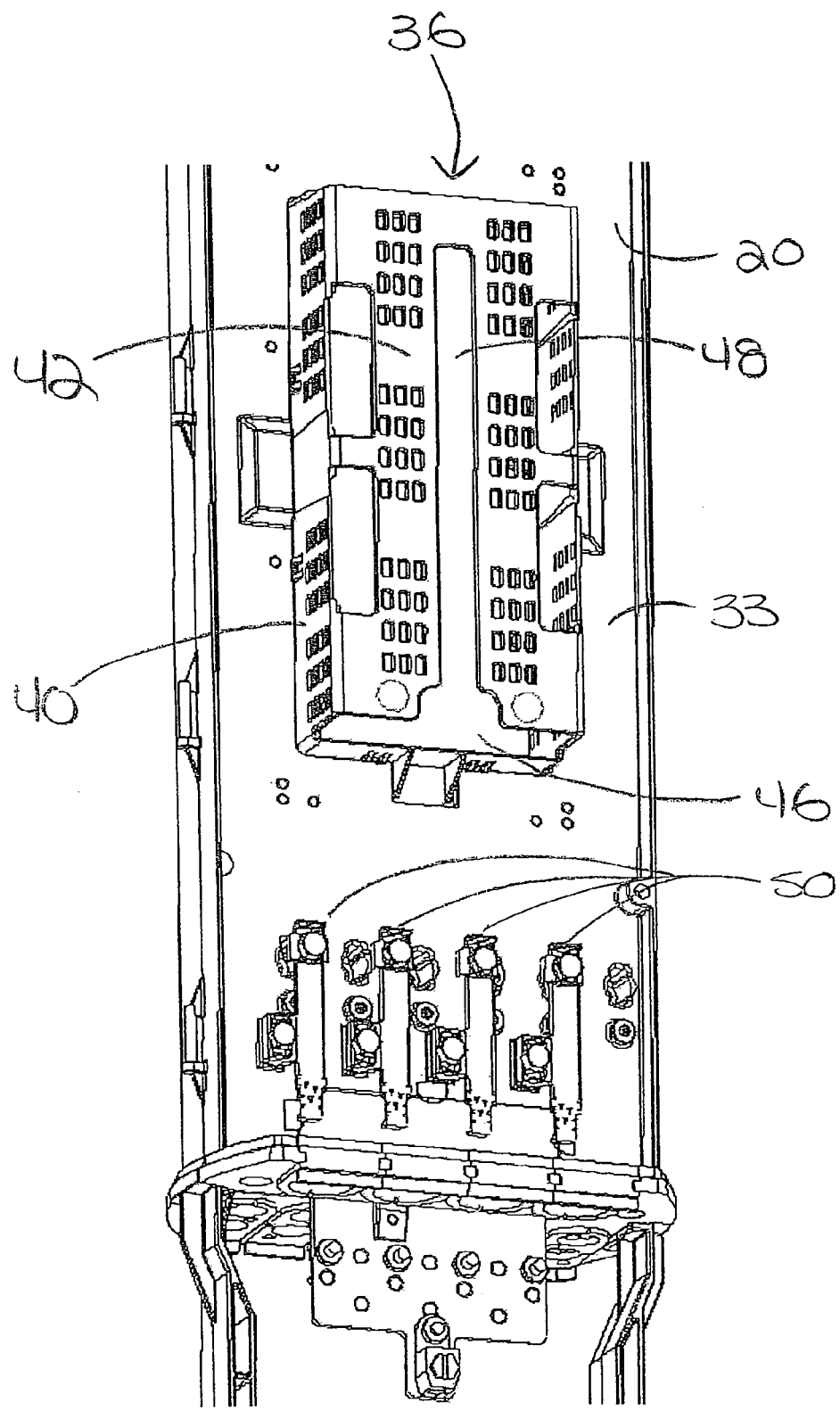
FIG. 12 is a rear, slightly upward perspective view of the internal support frame of FIG. 3 showing from the central office side the pass through interface between the drop and central office sides of the backboard.

In the illustrated embodiment, the spliced slack storage basket 36 is defined by four sidewalls 40 that extend perpendicular to the plane of the backboard 20 and a rear wall 42 that extends parallel to the plane of the backboard 20 as shown in FIGS. 9, 10 and 12. The basket 36 is open on the drop side 35 of the backboard 20 and extends through the plane of the backboard such that the rear wall 42 of the basket is spaced a distance outward from the outer surface of the central office side 33 of the backboard (see FIG. 12). Preferably, the basket 36 is of sufficient size to ensure that enough slack can be stored in the basket 36 to allow splicing operations to be performed in relatively close proximity to the installed enclosure 10. As will be appreciated, the size of the spliced slack storage basket 36 should also take into account the minimum allowable bend radius of the optical fibers in the buffer tubes.

Advantageously, in the illustrated embodiment, the spliced slack storage basket 36 also provides the structure on which the splice trays 32 are mounted (see FIG. 15). Thus, when the splice trays 32 are secured to the internal support frame 16, they are secured over the basket 36 thereby providing further protection to the slack spliced buffer tubes 38. While the embodiment illustrated in FIGS. 9-12 includes a single basket that is open to the drop side of the enclosure, the backboard can be configured with a basket on only the central office side of the enclosure (see FIGS. 18-20) or with baskets on both sides of the backboard. Likewise, splice trays can be mounted on either or both sides of the backboard.

As noted above, the fiber optic splice enclosure 10 of the present invention includes a separate area or arrangement for storage of the express buffer tubes 19. In the illustrated embodiment, this area (referenced as 44) is provided on the central office side 33 of the backboard 20 (see FIG. 10). In particular, the portion of the backboard in surrounding relation to the rear wall 42 of the basket 36 defines the area 44 within which the slack of the express buffer tubes 19 can be coiled. As will be appreciated, the express buffer tube storage area 44 can have different configurations and be arranged in different locations. Additional details regarding slack storage baskets and express buffer tube storage areas can be found in commonly owned, co-pending U.S. application Ser. No. 11/066,081 filed Feb. 25, 2005 entitled "Fiber Optic Splice Enclosure," the disclosure of which is incorporated herein by reference.

Advantageously, the slack storage basket 36 is configured to allow the buffer tubes 38 to enter the basket 36 from either the drop or central office side 35, 33 of the internal support frame 16. This flexibility permits technicians to route the buffer tubes and/or fibers in the most efficient manner. Specifically, buffer tubes or fibers 38 can enter the basket 36 through the open front side of the basket on the drop side 35 of the backboard 20. Additionally, one or more openings are provided in the walls of the slack storage basket 36 that allow buffer tubes or fibers to be routed into the basket from the rear side of the basket on the central office side 33 of the backboard 20. In this instance, the underside of the slack storage basket 36 includes a large opening 46, best shown in FIG. 12, through which buffer tubes or fibers can enter the basket from the central office side 33 of the backboard 20.

Figure 11:
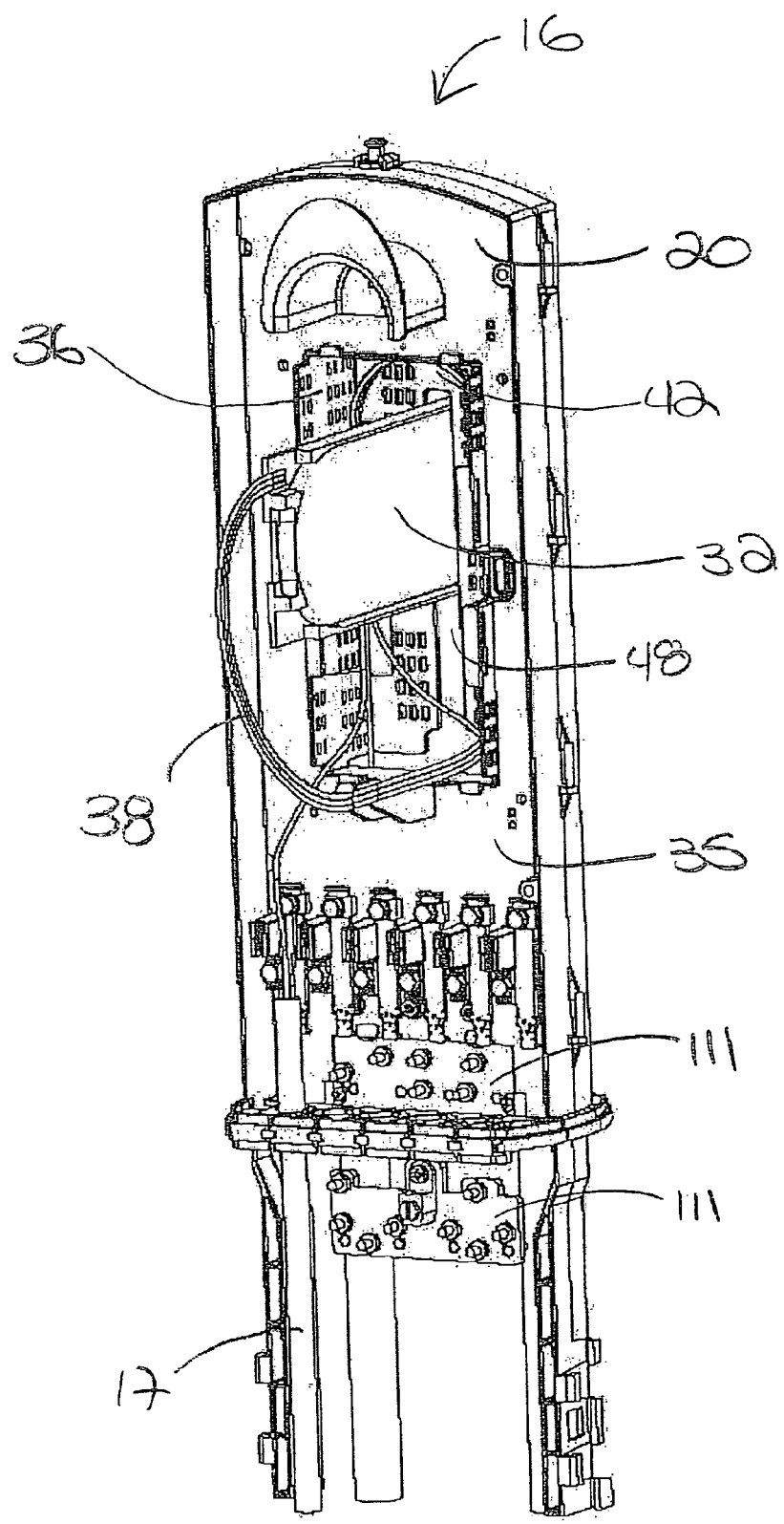
FIG. 11 is a front perspective view similar to FIG. 9 showing the splice tray being inserted through a pass through interface between the drop and central office sides of the backboard.

The slack storage basket 36 of the illustrated embodiment is also configured to allow splice trays 32 to pass through the basket between the drop and central office sides 35, 33 of the internal support frame 16. In particular, in the illustrated embodiment, an elongated opening 48 is provided through which a splice tray 32 can pass when arranged sideways as shown in FIG. 11. The ability to pass the tray 32 through the basket 36 can be useful if any portion of the enclosure is damaged. The passing through of the splice tray 32 to the central office side 33 of the internal support frame 16 is facilitated if the cables are installed from the central office side.

When the optical fibers of a feeder cable are to be spliced to one or more drop cables, the express buffer tubes 19 of the applicable feeder cable can be separated from the buffer tubes 38 that are to be spliced and routed to the express buffer tube storage area 44 on the central office side of the backboard 20 (see FIG. 10) where they are out of the way and protected from damage during subsequent splicing operations. The one or more buffer tubes 38 that are to be spliced to the drop cables 17 transition into the spliced slack storage basket 36 through one of the openings 46 in the basket (see FIGS. 9 and 11). The buffer tubes 38 from the drop cables fed into the enclosure are then transitioned into the basket 36 as well. The buffer tubes from the feeder cable and the drop cable can then be attached to the splice tray 32 and the optical fibers are spliced together (e.g., using either mechanical or fusion splicing). Once the splicing is complete, the spliced buffer tubes 38 are wrapped into the spliced slack storage basket 36 and the splice trays 32 are mounted onto the basket and secured in place.

For securing the feeder cables and drop cables 15, 17 that are fed to the fiber optic splice enclosure 10, the support frame 16 includes cable attachment elements 50. Each feeder cable fed to the enclosure can be secured to a respective one of the cable attachment elements 50 on the central office side 33 of the backboard 20 (see FIG. 12). Likewise, each drop cable associated with the enclosure 10 can be connected to a respective one of the cable attachment elements 50 on the on the drop side 35 of the backboard 20 (see FIG. 13). To facilitate installation and maintenance of the fiber optic enclosure 10, one or more of the cable attachment elements 50 can comprise separable elements (best shown in FIGS. 21 and 22) that can be installed as well as removed and replaced in the field by technicians. This can greatly ease installation of the fiber cables in the field.

Figure 13:
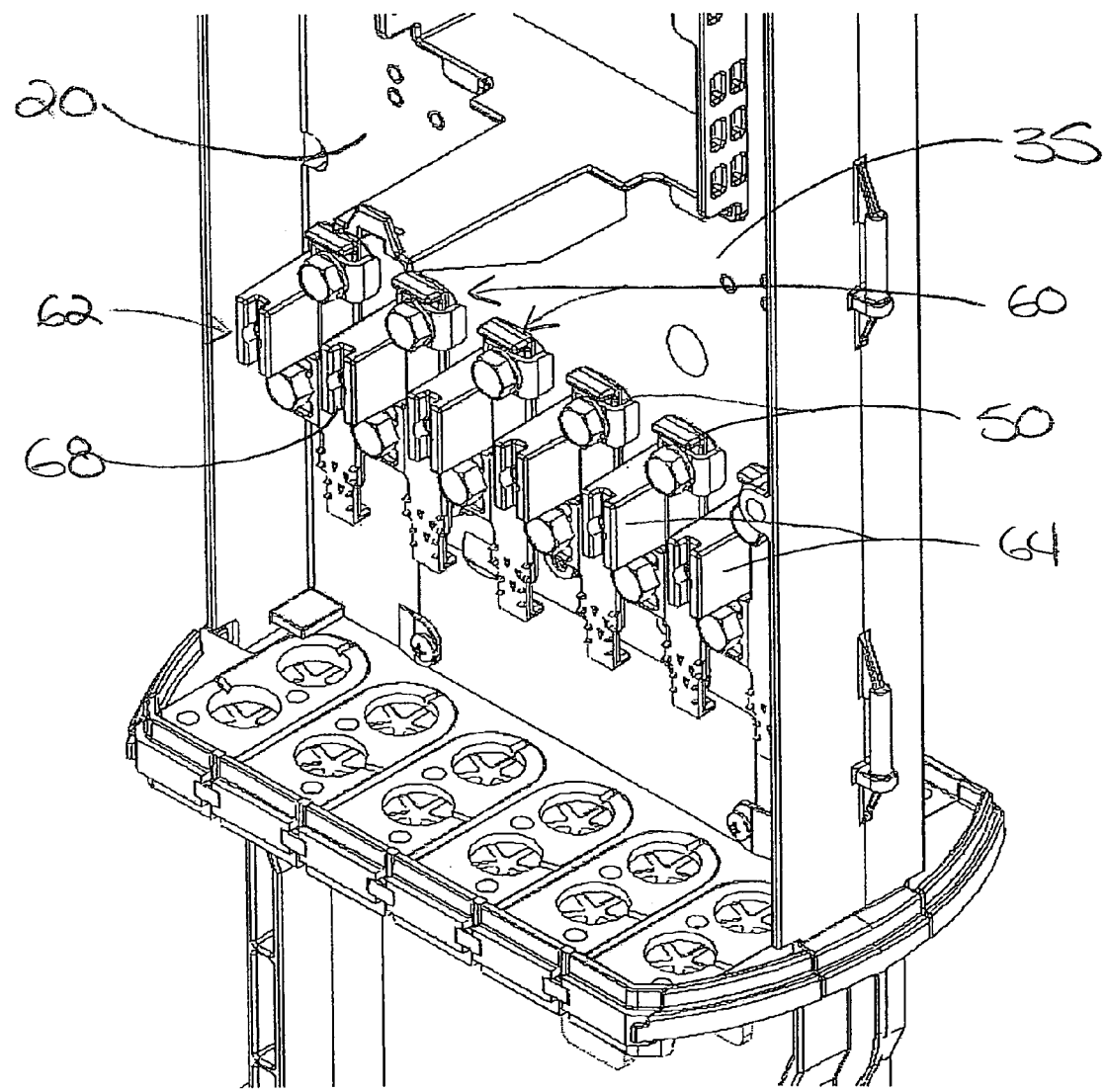
FIG. 13 is a partial front perspective view of the internal support frame of FIG. 3 showing the cable attachment elements.
Figure 14:
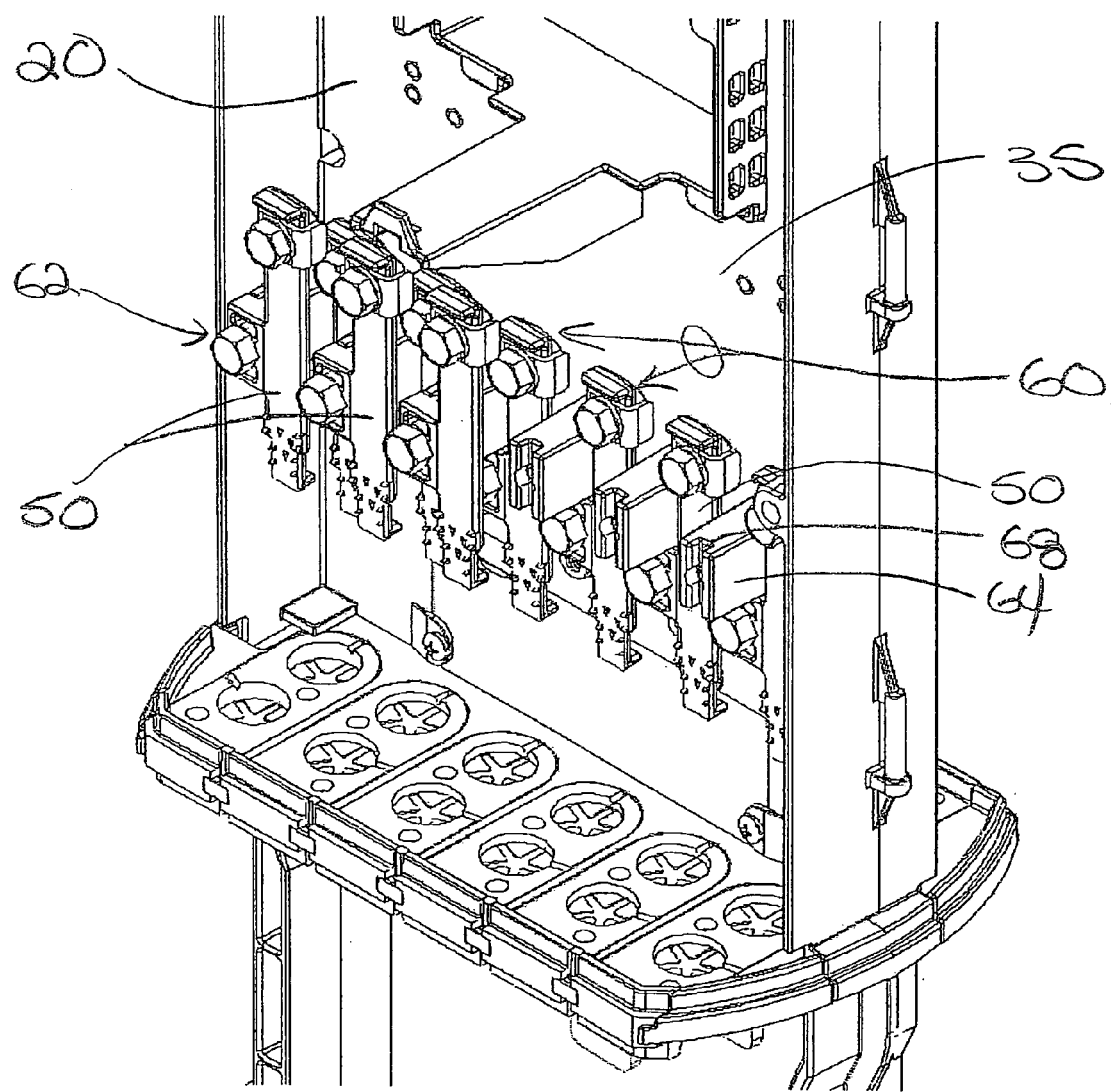
FIG. 14 is a partial front perspective view of the internal support frame of FIG. 3 showing the cable attachment elements with some attachment elements installed in a second, upper level.
Figure 21:
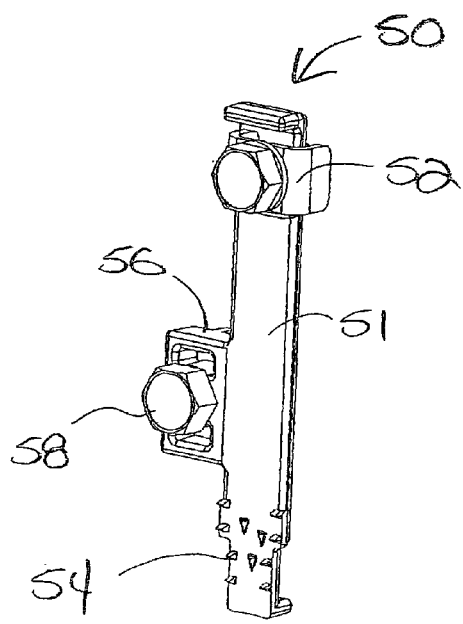
FIG. 21 is a front perspective view of one of the cable attachment elements used with the internal support frame of FIG. 3.
Figure 22:
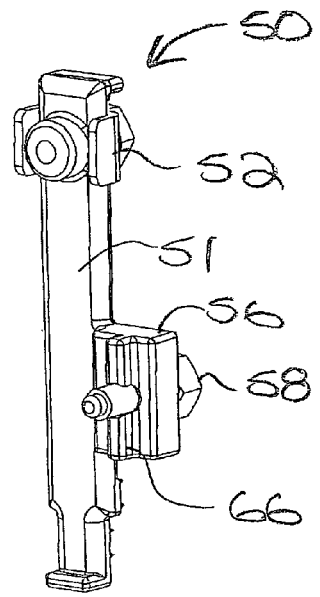
FIG. 22 is a rear perspective view of the cable attachment element of FIG. 21.

In the illustrated embodiment, the drop side 35 of the backboard 20 includes a plurality of cable attachment elements 50 that are arranged close to the lower edge of the backboard (see FIGS. 13 and 14). As shown in FIGS. 21 and 22, each of the cable attachment elements 50 has an elongated body 51 with a clamp 52 at its upper end for engaging one or more of the central strength members (CSM) of a particular feeder or drop cable. A series of barbs 54 are provided adjacent the lower end of the elongated body 51 for engaging the sheath of the feeder or drop cable to prevent it from rotating or moving axially after installation. A lateral projection 56 which supports a mounting bolt 58 extends outward from one side of the elongated body 51. The mounting bolt 58, which is captive in the lateral projection 56, is engageable with a complementary opening in the backboard 20 to secure the cable attachment element 50 to the backboard.

In order to use the space on the backboard 20 most efficiently, the plurality of cable attachment elements 50 can be arranged in two levels as shown in FIG. 14. In the illustrated embodiment, a first lower level 60 of cable attachment elements 50 is connected to the drop side 35 of the backboard 20 and a second upper level 62 of cable attachment elements 50 can be connected to the backboard 20 over the first lower level 60 of cable attachment elements. To this end, a plurality of mounting posts 64 extend outward from the surface of the backboard 20 to which the second level 62 of cable attachment elements 50 can be connected. Each mounting post 64 includes an opening for receiving the mounting bolt 58 of a cable attachment element 50 and, in this case, is arranged next to a respective one of the cable attachment elements 50 on the first level 60. As shown in FIG. 22, the rear face of the lateral projection 56 of each of the cable attachment elements 50 includes a rib 66 that is received in a mating groove 68 in the mounting post 62 (see FIG. 14) when the cable attachment element 50 is connected to the mounting post 64. This helps ensure that the cable attachment element 50 is locked into the proper alignment relative to the backboard 20.

Advantageously, the first level 60 of cable attachment elements 50 can be installed at the factory and the second level 62 can then be installed in the field as needed. With such an arrangement, the drop cables are much easier to hook-up in the field because the technician has free access to the cable attachments of the first level 60 without any interference from the second level 62 of cable attachments. Once the drop cables have been attached to the first level 60 of cable attachments, cable attachments 50 can then be added on the second level 62 by field technicians as needed by securing the attachments to the mounting posts 64 over the first level of cable attachments. In the embodiment illustrated in FIGS. 9-14, the drop side 35 includes six cable attachment elements 50 that are secured at the factory on the first level 60 and mounting posts 64 for securing an additional six cable attachment elements 50 on the second level 62 in the field. The central office side 33 of the backboard 20 includes four cable attachment elements 50 arranged in a single level to which the feeder cables can be attached. As will be appreciated, any desired number of cable attachment elements may be used in either one or multiple levels.

In order to enhance accessibility of the splice trays, particularly in circumstances where multiple splice trays are arranged in a stack on the basket, an additional part can be provided that easily mates to the backboard and allows the individual splice trays to separately pivot relative to the backboard. To this end, the enclosure 10 can include a separate hinge part 70 that can be supported on the backboard 20 to provide the desired pivoting splice tray capability. No additional modifications to the enclosure 10 are necessary. Thus, a common modular construction can be maintained for the backboard 20 with the hinge part 70 being added when hinged splice trays 32 are to be used. In the illustrated embodiment, the hinge part 70 is configured to accept splice trays 32 that have a pair of pins 72 arranged on a resiliently flexible support element 74 at the bottom of the splice tray (see FIGS. 16 and 17).

In the illustrated embodiment, the hinge part 70 includes a pair of opposing generally triangular sidewalls 76 that have angled upper edges 77 and rectangular rear and bottom walls 78, 80. The upper side of the hinge part 70 is substantially open. Opposed pairs of journal openings 82 are arranged in spaced relation along the upper edges 77 of the triangular sidewalls 76 of the hinge part 70. Each opposing pair of journal openings 82 defines a mounting position for a pivotable splice tray 32. In particular, each of the pins 72 arranged at the bottom of the splice tray 32 can be received in a respective one of the opposed journal openings 82 by flexing the support element 74 inward so as to position the pins 72 between the sidewalls 76 of the hinge part 70 and then releasing the support element so that the pins snap into the journal openings. To facilitate insertion of the pins 72 into the journal openings 82, each journal opening 82 has an associated recessed area 84 on the interior surface of the respective sidewall 76 that extends downward from the upper edge 77 of the sidewall to the journal opening (see FIG. 23).

Figure 16:
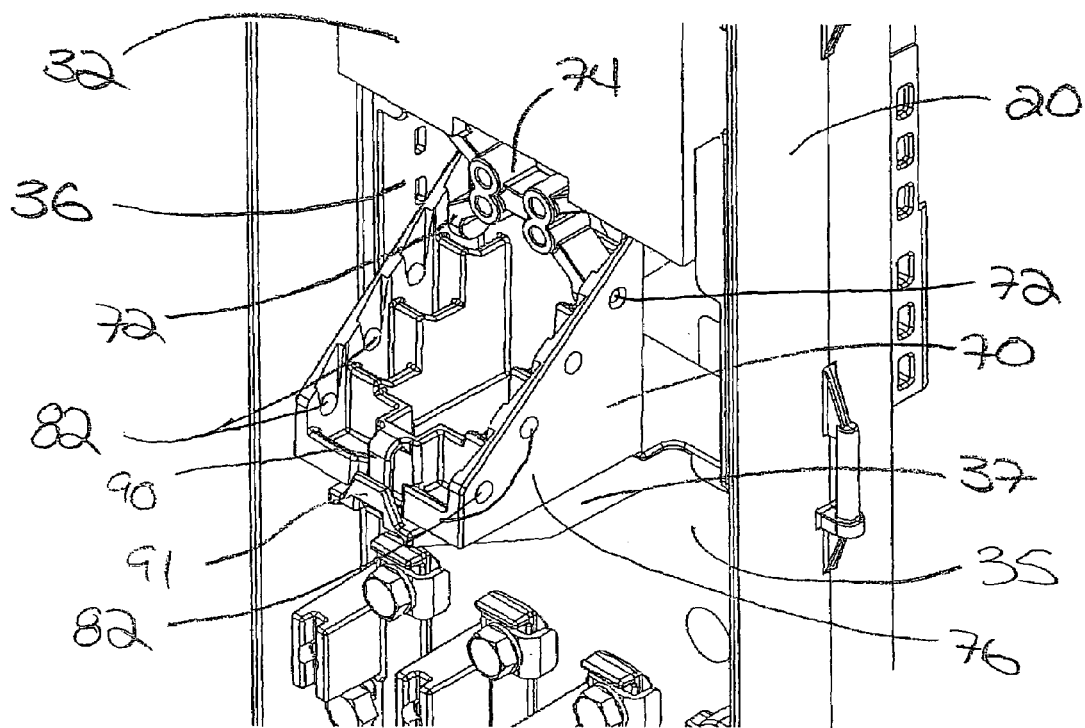
FIG. 16 is an enlarged partial front perspective view of the internal support frame of FIG. 15 showing the splice tray hinge part.
Figure 23:
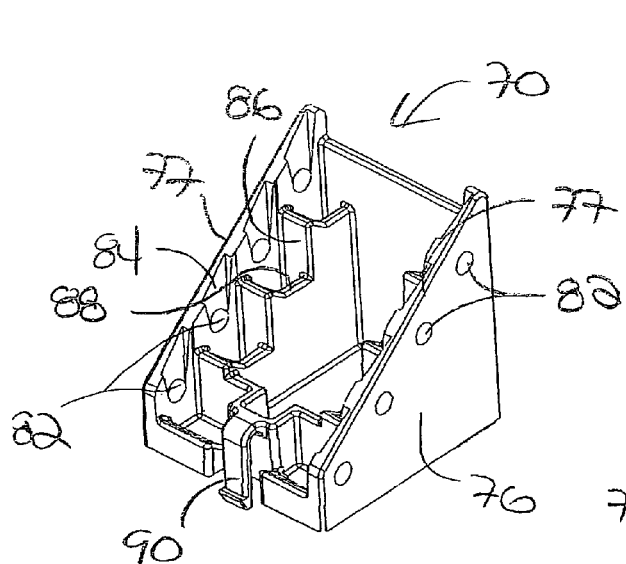
FIG. 23 is a front perspective view of the splice tray hinge part of the internal support frame of FIG. 15.

When received in the journal openings 82, the splice tray 32 is pivotable relative to the hinge part 70 between raised and lowered positions. To limit the pivoting movement of the splice trays 32 and help define the raised and lowered positions, each journal opening 82 has an associated pair of stop surfaces as best shown in FIG. 23. In the illustrated embodiment, these stop surfaces are defined by step-like structures that are arranged along the inside of each sidewall 76 of the hinge part 70 as best shown in FIG. 16. In particular, each "step" provides a vertical stop surface 86 and a horizontal stop surface 88 for a respective one of the journal openings 82.

Figure 17:
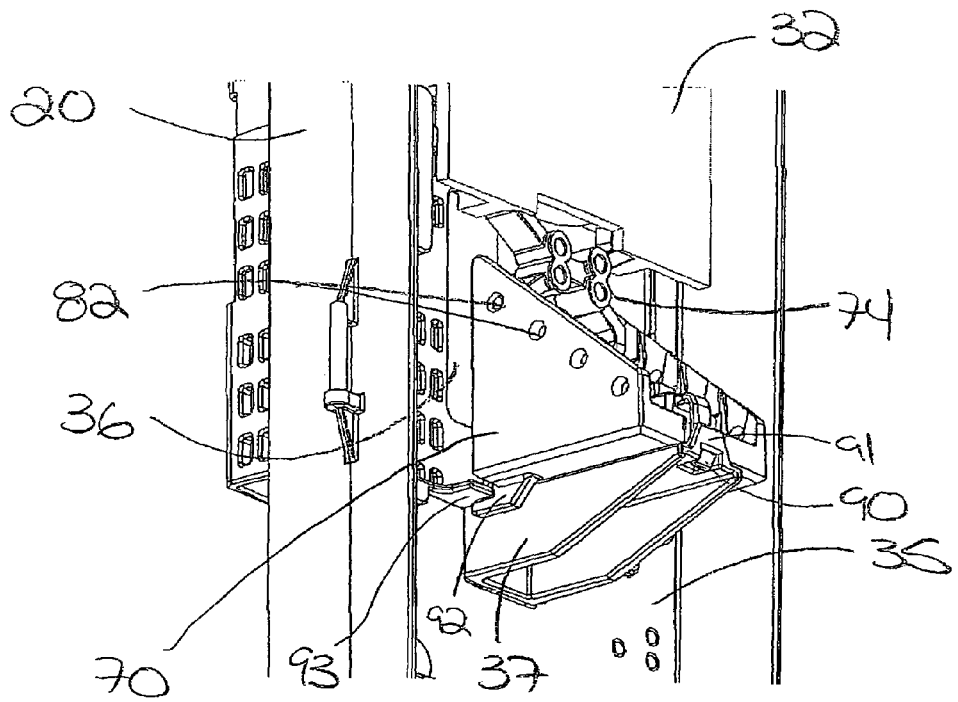
FIG. 17 is an enlarged partial front perspective view of the internal support frame of FIG. 15 showing the splice tray hinge part.
Figure 24:
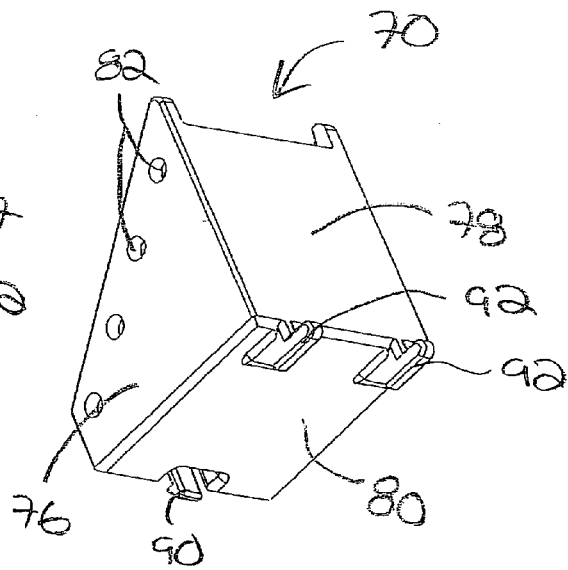
FIG. 24 is a rear perspective view of the splice tray hinge part of FIG. 23.

For mounting the hinge part 70 on the backboard 20, the hinge part 70 includes mounting elements that engage already existing structures on the backboard. In the illustrated embodiment, the hinge part 70 is designed to rest on the upper surface of the splice tray support arm 37 and the mounting elements include a spring latch 90 that is arranged adjacent the forward end of the hinge part 70. When installed on the support arm 37, the spring latch 90 is received in a latch opening at the forward end of the support arm and engages a catch 91 at the forward end of the latch opening. In the illustrated embodiment, the mounting elements further include a pair of legs 92 arranged at the rear edge of the bottom wall 80 of the hinge part 70 (see FIGS. 17 and 24). These legs 92 fit under a complementary pair of tabs 93 extending outward from the backboard 20 on either side of the support arm as shown in FIG. 17. The engagement of the two legs 92 underneath the two tabs 93 prevents upward movement of the hinge part 70 relative to the support arm 37 and the backboard 20.

To remove the hinge part 70 from the support arm 37, one must only disengage the spring latch 90 from the catch 91 at the forward end of the latch opening. The forward end of the hinge part 70 can then be lifted up and the legs 92 slid out from underneath the tabs 93 on the backboard 20. With the hinge part 70 removed, the upper surface of the support arm 37 is clear so as to be able to support conventional, un-hinged splice trays.

To provide further flexibility in configuring the internal support frame, the slack storage basket can be designed as a modular component. Specifically, based on the needs of particular customers or applications, using slack storage baskets 36 having different configurations may be desirable. To facilitate the use of such differently configured slack storage baskets 36, the backboard 20 and slack storage basket 36 can have a modular construction that allows different slack storage baskets to be interchangeably installed on the backboard. Thus, a single backboard design can be used while still providing flexibility with regards to the configuration of the slack storage basket.

Figure 25:
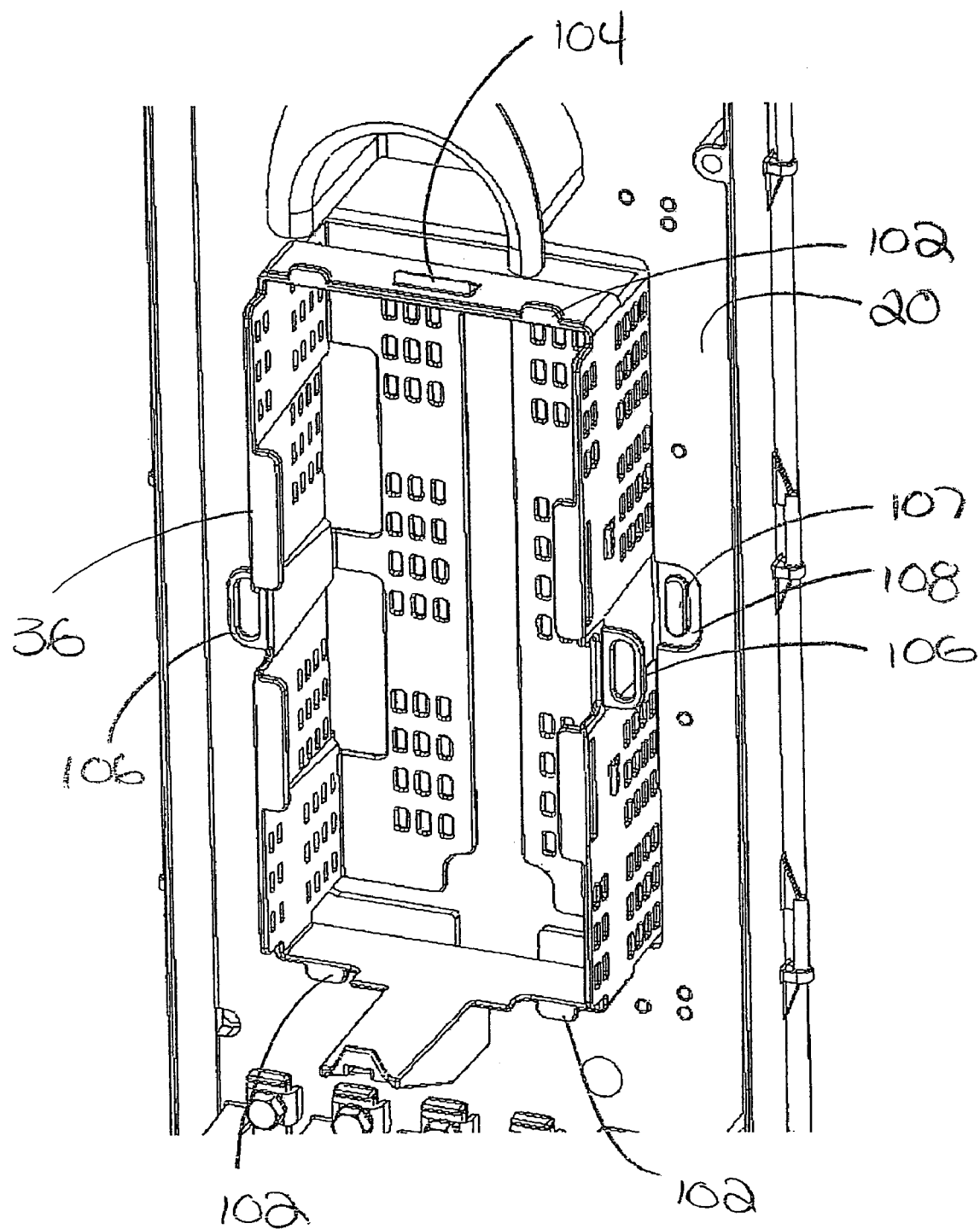
FIG. 25 is a front perspective view of the internal support frame of FIG. 3 showing the installation of the splice storage basket.
Figure 26:
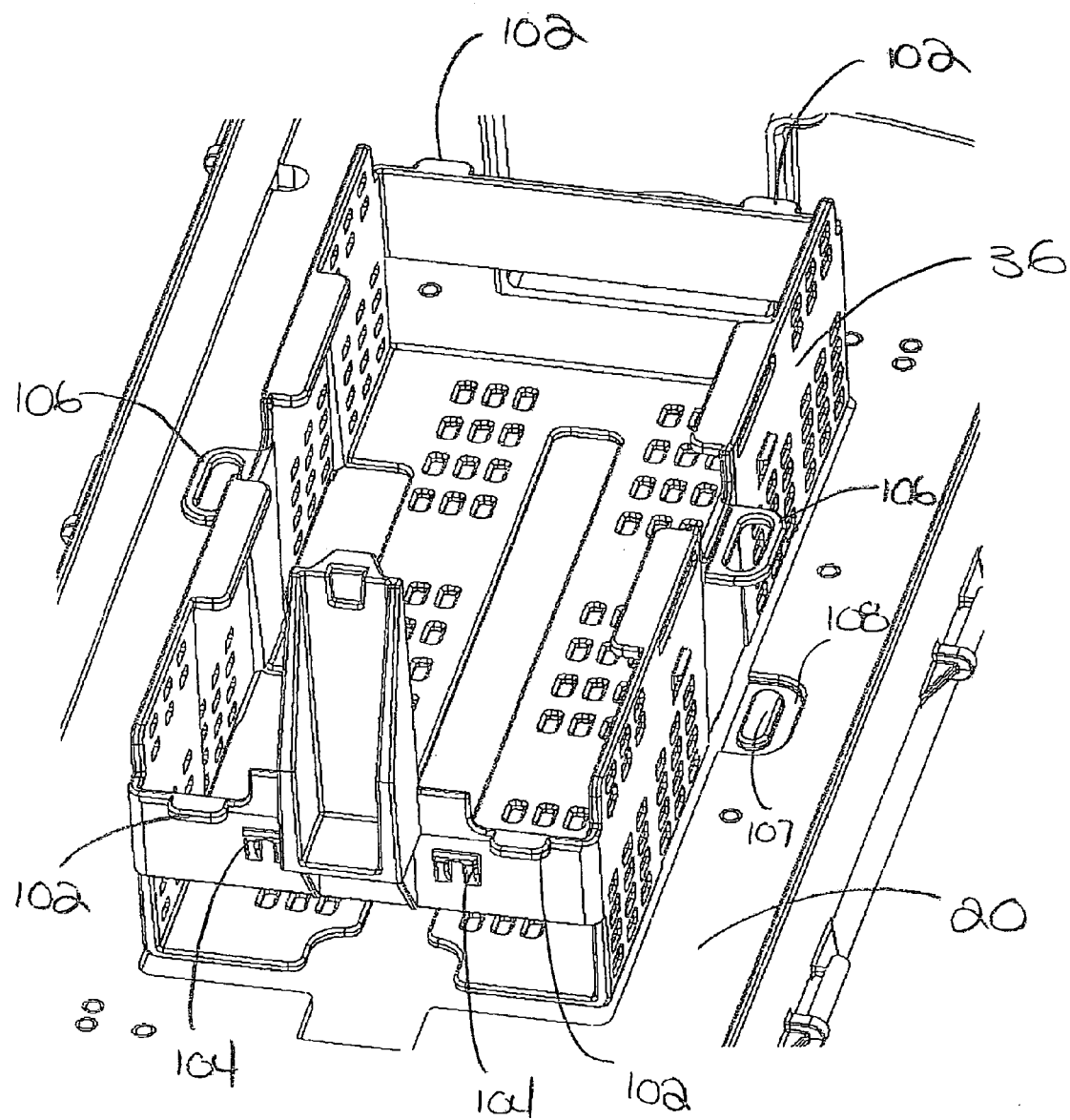
FIG. 26 is a bottom perspective view of the internal support frame of FIG. 3 showing the installation of the splice storage basket.
Figure 27:
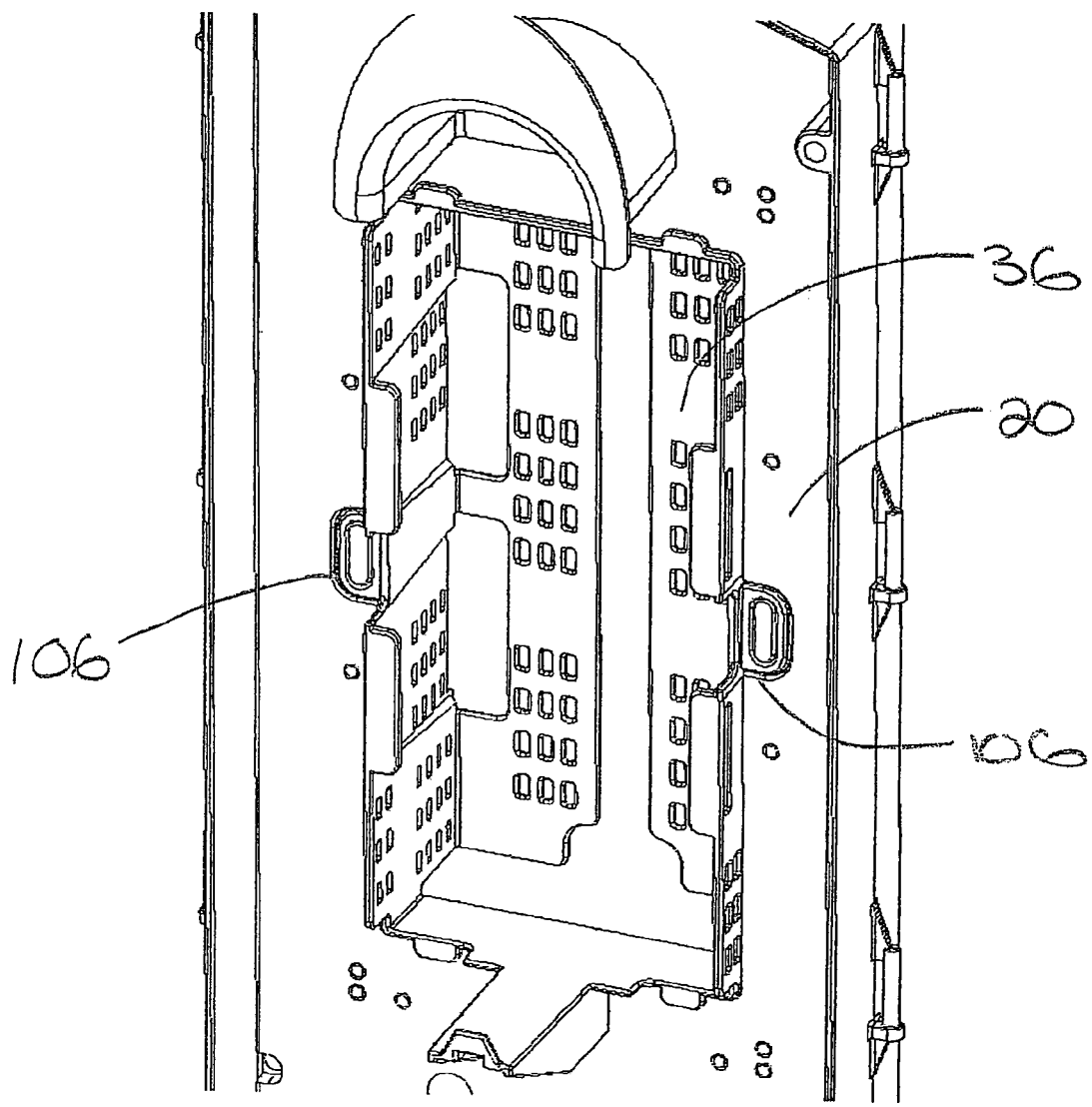
FIG. 27 is a front perspective view similar to FIG. 25 of the internal support frame of FIG. 3 showing the splice storage basket fully installed.

In this instance, the slack storage basket 36 is designed as a separate element or component that is engageable with the backboard 20. To this end, the backboard 20 includes a central opening within which the basket can be mounted as shown in FIGS. 25-27. The basket 36 is inserted into the opening from the side of the backboard 20 on which the open end of the basket 36 will be arranged when the basket is installed, which in the case of FIGS. 25-27 is the drop side. To secure the basket 36 in the opening, a series of lateral tabs 102 and ramped tabs 104 are arranged on the outer surfaces of the walls of the basket 36. In the illustrated embodiment, the lateral tabs 102 extend outward from the upper and lower sidewalls of the basket in perpendicular relation to such sidewalls as best shown in FIGS. 25 and 26. The ramped spring tabs 104, in turn, are located rearward on the basket 36 relative to the lateral tabs 102 on the upper and lower sidewalls and are configured so as to be able to slide past the edges of the opening in the backboard 20 as the basket 36 is inserted in the opening in the backboard 20. Once the ramped spring tabs 104 clear the edges of the opening, their sheer forward faces engage the edges of the opening so that the edges are captured between the sheer forward face of the ramped snap tabs 104 on one side and the rigid lateral tabs 102 on the other thereby securing the basket 36 in the opening.

To help ensure that the basket 36 is precisely located in the proper position on the backboard and to provide added stability, the basket includes a pair of ears 106 that extend outward from either lateral side of the basket. Each ear 106 has a central opening and engages a mating post 107 and oval groove 108 (see FIGS. 25 and 26) on the surface of the backboard when the basket 36 is secured to the backboard 20 (see FIG. 27). In this case, each ear also has associated ramped tabs on the respective lateral side of the basket 36 which are able to slide through the opening in the backboard 20 and into engagement with the opposite side of the backboard in order to further secure the basket 36 in the opening.

Figure 28:
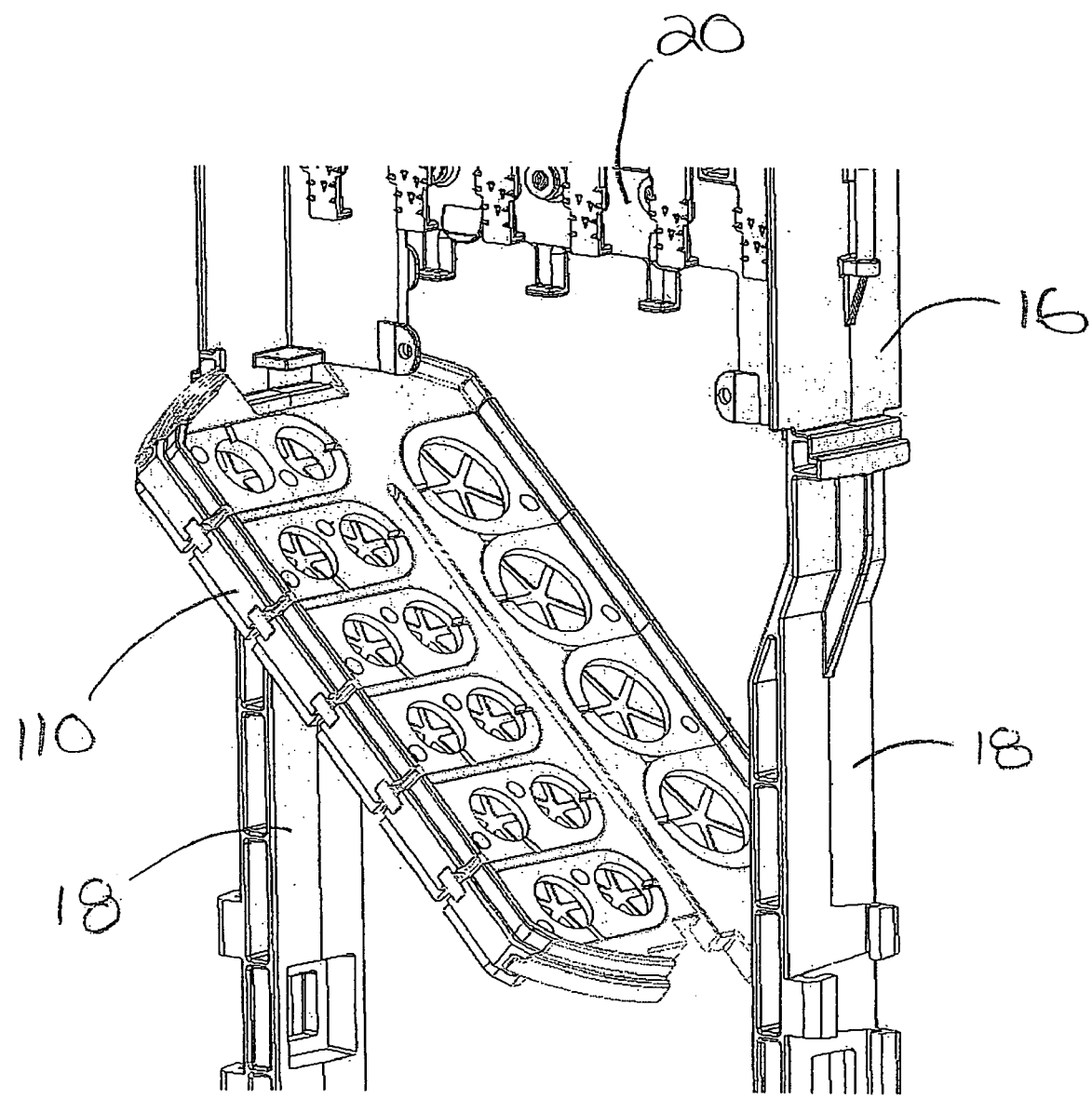
FIG. 28 is a partial front perspective view of an embodiment of the invention in which the bottom plate is a modular component that can be slid into place at the lower edge of the backboard.

Additional modularity can be provided by also designing the bottom plate 110 and associated grounding bar 111 as separate parts that can be attached to the backboard 20. In this way, differently configured bottom plates and grounding bars can be used depending on the needs of the particular customer or application. As shown in FIG. 28, the bottom plate 110 can be slid into place at the lower edge of the backboard 20 between the two legs 18 of the internal support frame 16. Because the bottom plate 110 is a separate part, there is no need to provide entirely different support frames to provide different types of bottom plates. Thus, it is much easier and cost effective to customize the bottom plate 110 for a desired application. For instance, different bottom plates may have different numbers of grommets for drop and feeder cables associated with the enclosure. Alternatively, the bottom plate 110 may not have any grommets on at least such as is the case with the bottom plate 110 in the embodiment of FIG. 19 discussed below.

Figure 20:
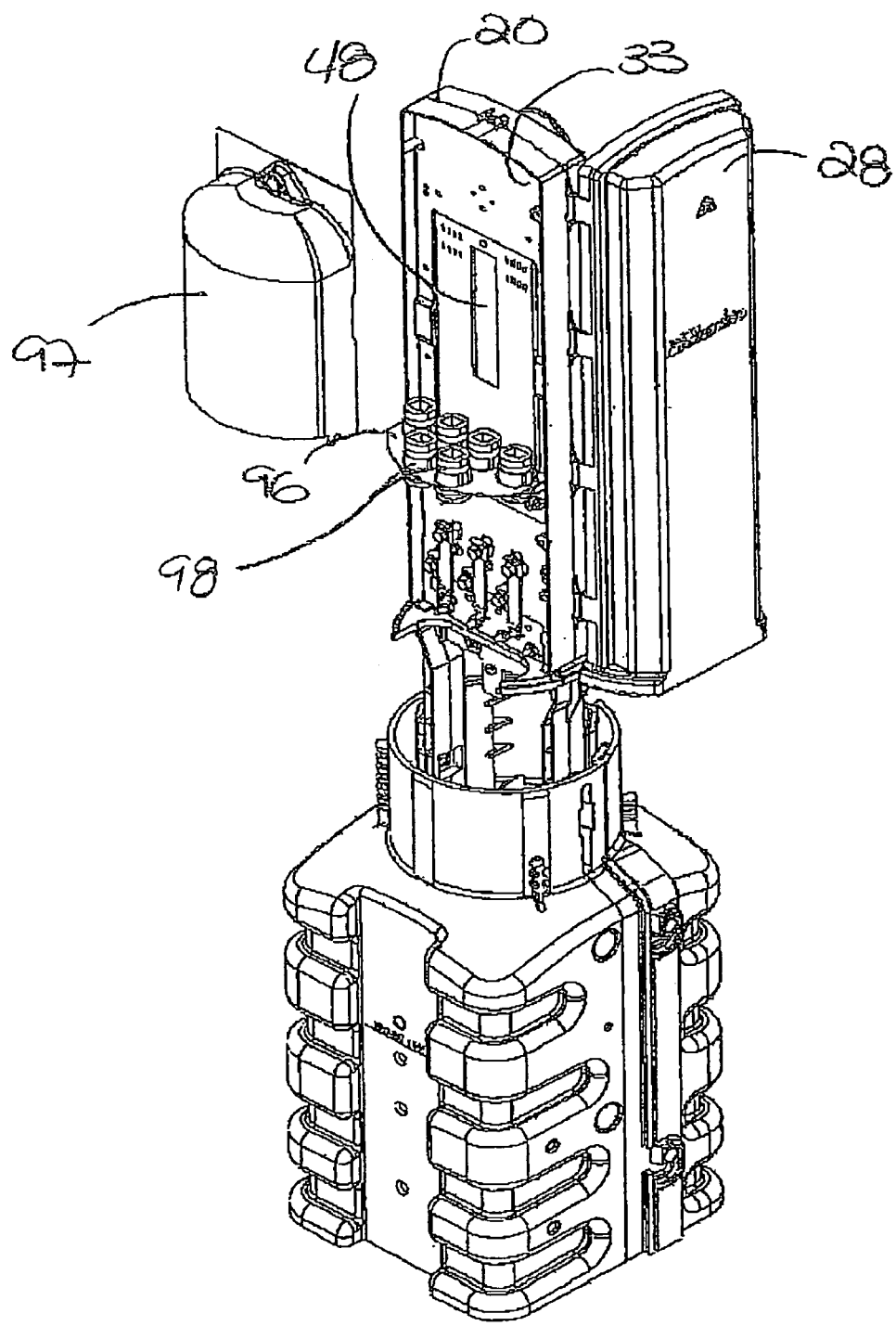
FIG. 20 is a rear perspective view of the internal support frame and base section of FIG. 18 with the sealed connector interface cover exploded.
Figure 29:
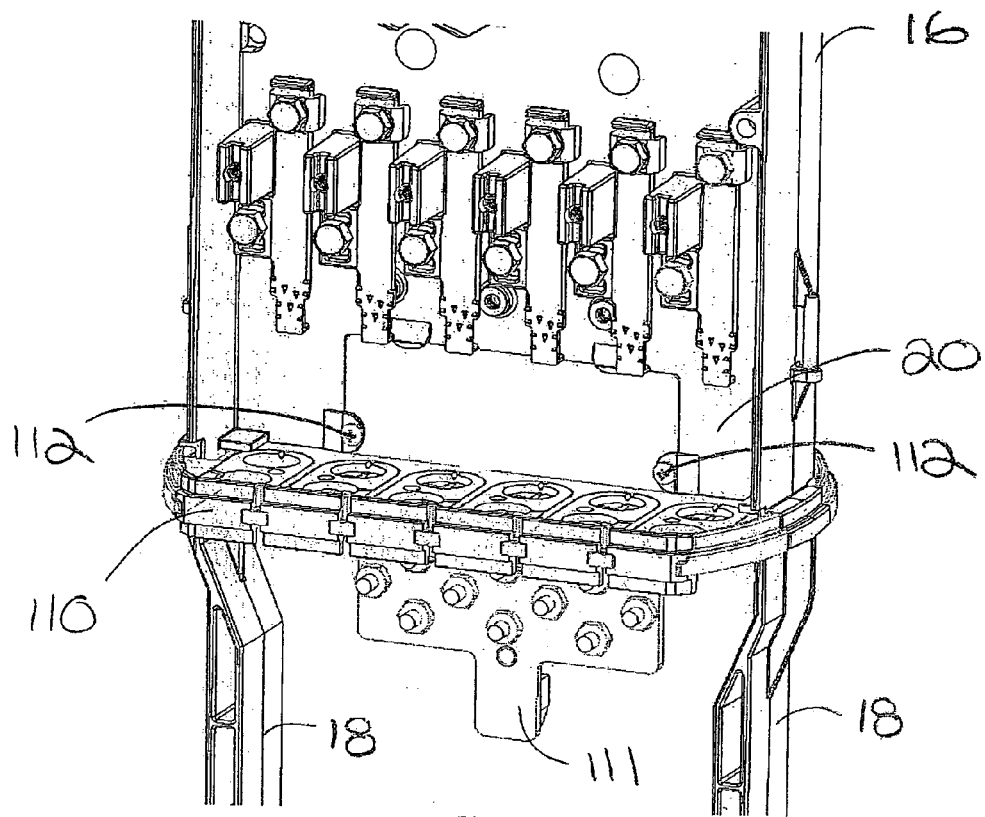
FIG. 29 is a partial front perspective view of the embodiment of FIG. 28 showing bow the bottom plate and grounding plate are connected.
Figure 30:
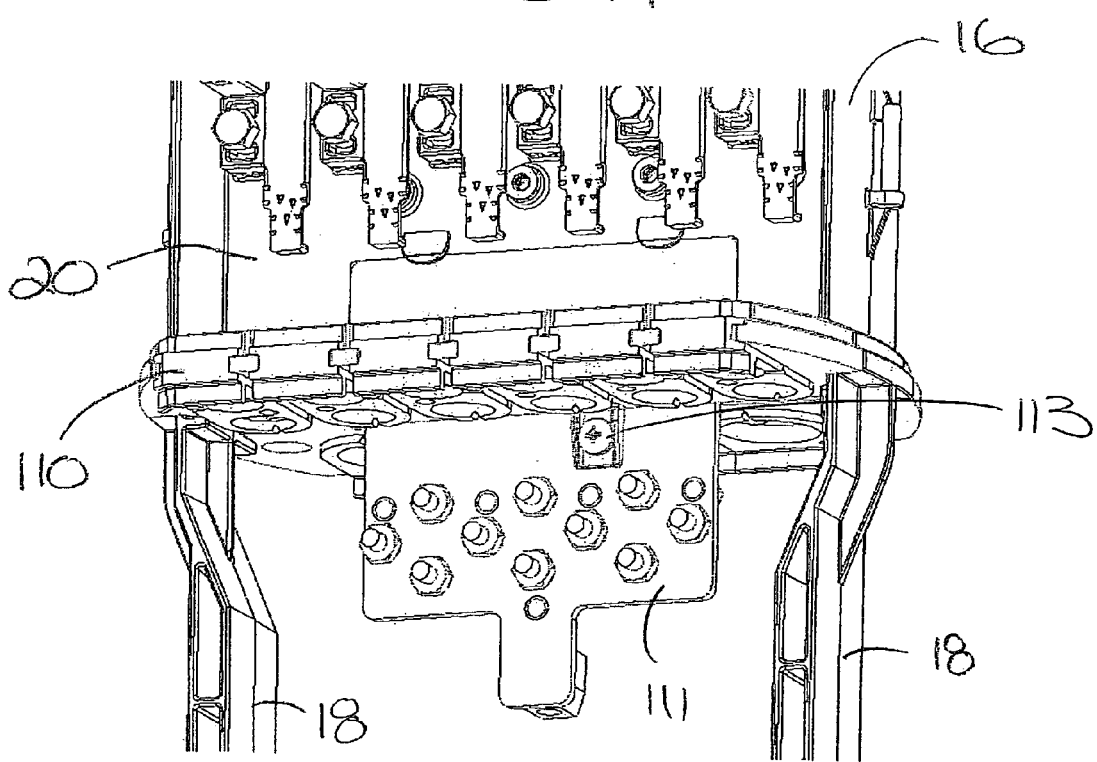
FIG. 30 is a partial front perspective view similar to FIG. 29 showing how the bottom plate and grounding plate are connected.

The grounding plate 111 for the cables that is associated with the bottom plate 110 can also be a separate part to allow for further flexibility in configuring the enclosure. In the illustrated embodiment, the grounding plate 111 can be secured to the lower surface of the bottom plate 110 so that the grounding plate is arranged underneath the bottom plate as best shown in FIG. 20. Alternatively, two grounding plates 111 can be provided with one secured to the backboard 20 above the bottom plate 110 and one secured under the bottom plate such as in the embodiment shown in FIG. 11 or only a single grounding plate 111 may be provided above the bottom plate 110. In this case, the mounting plate 110 is secured to the grounding plate 111 by a bolt type fastener 113 and the grounding plate is secured to the backboard 20 by a pair of bolt type fasteners 112 (see FIGS. 29 and 30).

Figure 18:
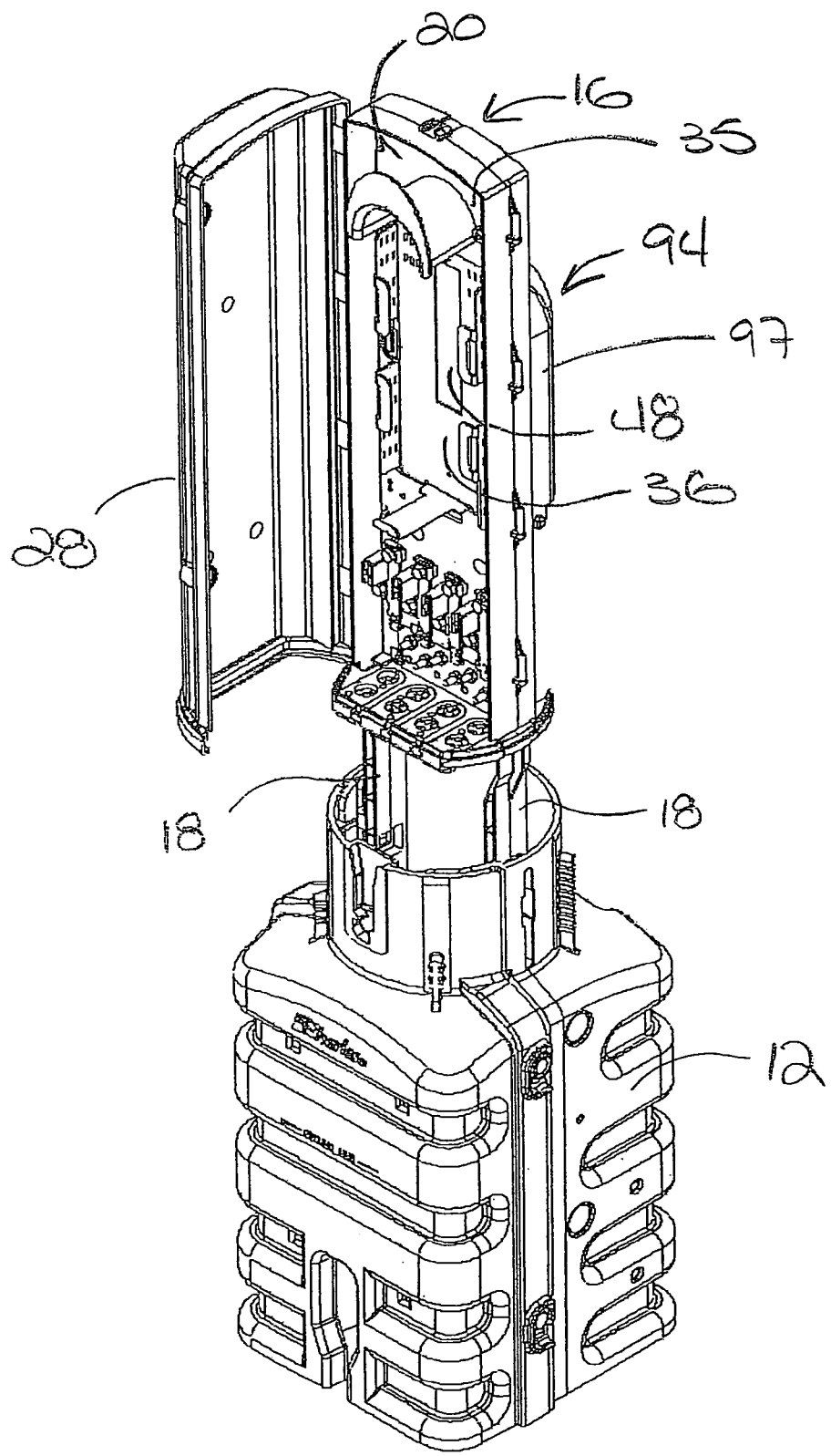
FIG. 18 is a front perspective view of an alternative embodiment of an internal support frame and base section for a fiber optic splice enclosure according to the present invention that includes a sealed connector interface.
Figure 19:
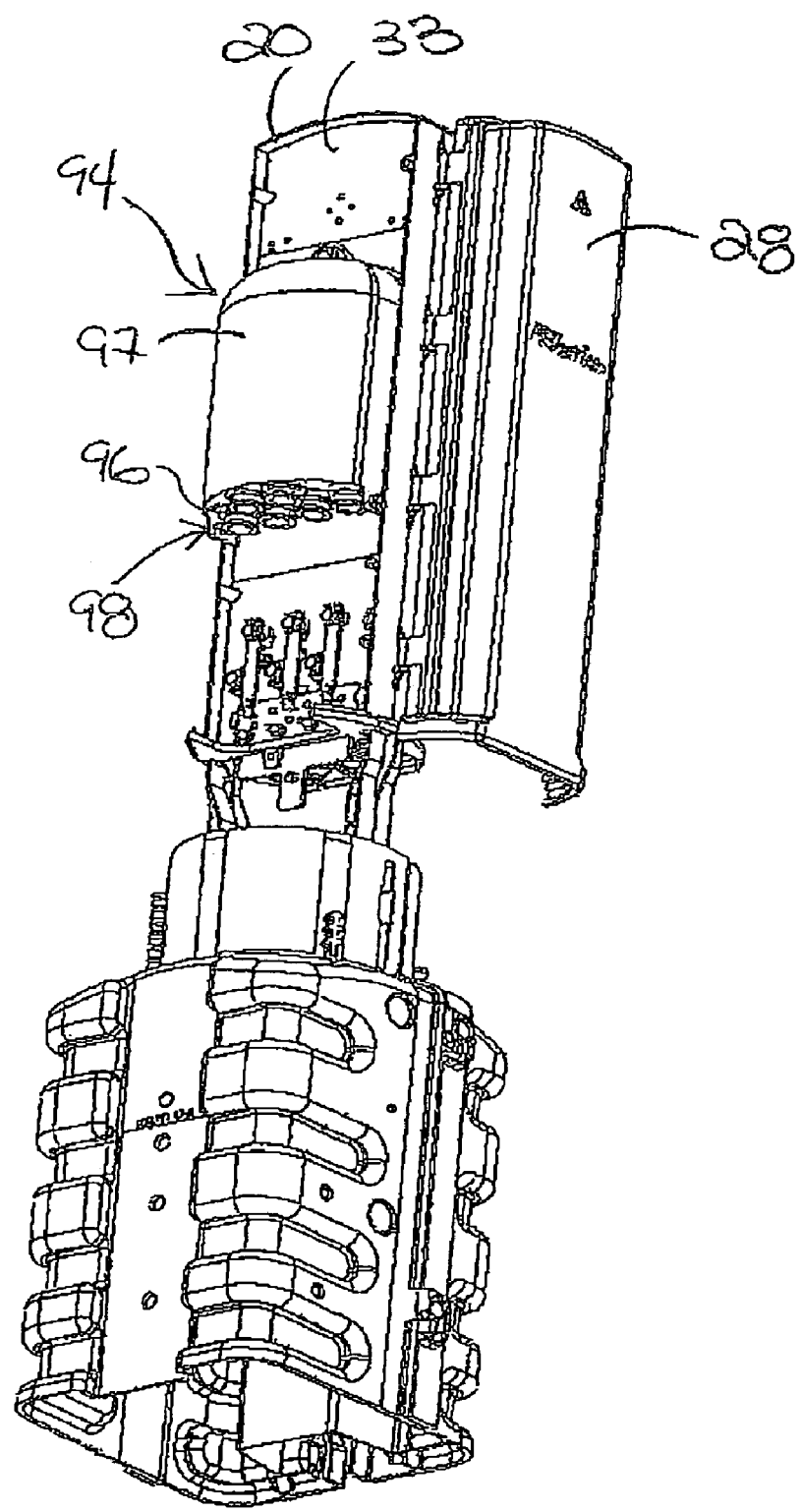
FIG. 19 is rear perspective view of the internal support frame and base section of FIG. 18.

A further embodiment of a fiber optic splice enclosure according to the present invention is shown in FIGS. 18-20. This embodiment incorporates a rugged, weatherproof connector interface 94 to separate the central office portion of the enclosure from the drop portion of the enclosure. In particular, the illustrated embodiment includes a bulkhead 96 that extends outward from the drop office side 33 of the backboard 20 at a location below the pass-thru opening 48 in the backboard 20 that leads to the basket 36, which in this case is on the central office side 35 of the backboard 20. The portion of the central office side of the enclosure above the bulkhead 96 is sealed off using a cover 97 or other suitable barrier such as a door. In this case, the entire central office side of the backboard is enclosed via an internal weathertight door 28 as shown in FIG. 18. As in the previous embodiments, the internal support frame 16, backboard 20, inner door 28, bulkhead 96 and cover 97 can be enclosed by a substantially cylindrical exterior dome that engages with the base section.

With this arrangement, all of the cables, buffer tubes and optical fibers on the central office side and those above the bulkhead 96 on the drop side are protected from inclement weather conditions via either the inner door 28 on the central office side or the bulkhead 96 and cover 97 on the drop side. Thus, the bulkhead 96 serves as an interface between the protected and unprotected portions of the enclosure 10. To provide for connections through the bulkhead 96, the bulkhead supports a plurality of connector adaptors 98 as shown in FIGS. 19 and 20. These connector adaptors 98 are configured to interconnect the drop cables below the bulkhead 96 with pigtails above the bulkhead 96. The pigtails are transitioned to the drop side from the basket 36 on the central office side of the backboard 20 through the pass-thru opening 48. On the central office side of the backboard, the feeder cables are spliced to pigtails via splice trays.

To provide maximum protection against inclement weather conditions, the ends of the drop cables connecting to the bulkhead 96 can be provided with rugged, threaded connector plugs. Similarly, the lower portions of the connector adaptors 98 that extend below the bulkhead 96 and mate with the drop cables can be configured to provide a rugged, sealed threaded connection to the rugged connector plugs on the drop cables. In this way, the connections that are below the bulkhead 96 and outside of the protection of the cover 97 are protected from the elements. However, the connections of the pigtails to the upper portions of the connector adaptors 98 that extend above the bulkhead 96 can be conventional, unsealed connections because the connections are protected from the elements via the bulkhead and cover 96, 97. In a preferred embodiment, the connector adaptors 98 supported by the bulkhead 96 and the rugged connectors on the feeder cables can be adaptors and connectors sold by Corning Cable Systems of Hickory, N.C. under the tradename OptiTap™. While the embodiment illustrated in FIGS. 18-20 utilizes a sealed connector interface across the bulkhead, the bulkhead connectors and the connectors on the drop cables could also have an unsealed configuration.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fiber optic splice enclosure for housing an interconnection contained in a splice tray between at least one optical fiber of a feeder cable and at least one optical fiber of a drop cable, the optical fiber of the feeder cable being at least partially contained in a feeder cable buffer tube, the fiber optic splice enclosure comprising:

a support frame arranged in the enclosure, the support frame including a first side and a second side;

a basket arranged on the support frame for storing slack of a spliced buffer tube transitioning to the splice tray, the basket being sized so as to be able to store slack of the spliced feeder cable buffer tube while maintaining a predetermined tube bend radius, the basket having at least one wall and being open on the first side of the support frame, the basket wall having at least one opening therein through which the feeder cable buffer tube can be routed from the second side of the enclosure into the basket; and a splice tray mounting arrangement arranged on the first side of the support frame for supporting the splice tray.

2. The fiber optic splice enclosure of claim 1 wherein the support frame includes a backboard and the basket extends through the backboard.

3. The fiber optic splice enclosure of claim 1 wherein the opening in the basket wall is sized such that a splice tray can pass through the opening.

4. The fiber optic splice enclosure of claim 1 wherein an express buffer tube storage arrangement is arranged on the second side of the support frame.

5. The fiber optic splice enclosure of claim 1 further including a dome that is removably positionable over the support frame.

6. The fiber optic splice enclosure of claim 5 further including a snap tab arranged on the support frame, the snap tab being insertable in and engageable with an opening on the dome so as to secure the dome on the support frame.

7. The fiber optic splice enclosure of claim 1 further including a first door carried by the support frame for enclosing the first side of the support frame and a second door carried by the support frame for enclosing the second side of the support frame.

8. The fiber optic splice enclosure of claim 1 further including a plurality of cable attachment elements arranged on the support frame for securing cables to the support frame, at least one of the cable attachment elements being removably attachable to the support frame.

9. The fiber optic splice enclosure of claim 1 further including a splice tray hinge part snap engageable with the splice tray mounting arrangement so as to be attachable thereto and detachable therefrom, the splice tray hinge part including a plurality of spaced pairs of journal openings for receiving complementary posts carried by a splice tray such that splice tray is pivotable relative to the splice tray mounting arrangement.

10. The fiber optic splice enclosure of claim 1 further including a bulkhead and a barrier arranged on the second side of the enclosure that define an enclosed area on the second side of the enclosure within which the opening in the basket wall is arranged and further including a plurality of connector adaptors carried by the bulkhead, the connector adaptors each including a rugged, sealed connector that extends through the bulkhead to outside the enclosed area defined by the bulkhead and barrier for mating with a mating connector carried by a feeder cable.

11. A fiber optic splice enclosure for housing an interconnection between at least one optical fiber of a feeder cable and at least one optical fiber of a drop cable, the fiber optic splice enclosure comprising:

a support frame arranged in the enclosure;
a dome that is removably positionable over the support frame; and
a resiliently flexible snap tab arranged on the support frame, the snap tab being insertable in and engageable with an opening on the dome so as to secure the dome on the support frame.

12. The fiber optic splice enclosure of claim 11 wherein the snap tab is arranged on an upper edge of the support frame.

13. The fiber optic splice enclosure of claim 12 wherein the opening in the dome is arranged on a top of the dome.

14. The fiber optic splice enclosure of claim 13 wherein the dome has a substantially rectangular cross-sectional shape.

15. The fiber optic splice enclosure of claim 11 further including a plurality of cable attachment elements arranged on the support frame for securing cables to the support frame, at least one of the cable attachment elements being removably attachable to the support frame.

16. The fiber optic splice enclosure of claim 11 further including a splice tray hinge part snap engageable with a splice tray mounting arrangement on the support frame so as to be attachable thereto and detachable therefrom, the splice tray hinge part including a plurality of spaced pairs of journal openings for receiving complementary posts carried by a splice tray such that splice tray is pivotable relative to the splice tray mounting arrangement.

17. The fiber optic splice enclosure of claim 11 further including hinge elements arranged on opposed lateral edges of the support frame.

18. A fiber optic splice enclosure for housing an interconnection between at least one optical fiber of a feeder cable and at least one optical fiber of a drop cable, the fiber optic splice enclosure comprising:

a support frame arranged in the enclosure;
a plurality of hinge elements arranged on opposed lateral edges of the support frame for receiving doors; and
a resiliently flexible snap tab arranged on the support frame for securing a dome on the support frame.

19. A fiber optic splice enclosure for housing an interconnection between at least one optical fiber of a feeder cable and at least one optical fiber of a drop cable, the fiber optic splice enclosure comprising:

a support frame arranged in the enclosure and including a backboard;
a plurality of cable attachment elements arranged on the support frame for securing cables to the support frame, each of the cable attachment elements including a clamp for engaging a respective cable, at least one of the cable attachment elements being removably attachable to the support frame;
a plurality of mounting posts extending outward from the surface of the backboard and defining mounting positions on which the at least one removably attachable cable attachment element can be mounted, wherein a first group of the plurality of cable attachment elements are secured in mounting positions relatively closer to the surface of the backboard than the mounting positions defined by the mounting posts.

20. The fiber optic splice enclosure of claim 19 wherein each mounting post includes a groove that mates with a rib on the at least one removably attachable cable attachment element when the removably attachable cable attachment element is mounted on the respective mounting post.

21. The fiber optic splice enclosure of claim 19 further including a splice tray mounting arrangement arranged on the support frame for supporting a plurality of splice trays and a splice tray hinge part snap engageable with the splice tray mounting arrangement so as to be attachable thereto and detachable therefrom, the splice tray hinge part including a plurality of spaced pairs of journal openings for receiving complementary posts carried by a splice tray such that splice tray is pivotable relative to the splice tray mounting arrangement.

22. A fiber optic splice enclosure for housing an interconnection in a splice tray between at least one optical fiber of a feeder cable and at least one optical fiber of a drop cable, the fiber optic splice enclosure comprising:
- a support frame arranged in the enclosure;
- a splice tray mounting arrangement arranged on the support frame for supporting a plurality of splice trays; and
- a splice tray hinge part snap engageable with the splice tray mounting arrangement so as to be attachable thereto and detachable therefrom, the splice tray hinge part including a plurality of spaced pairs of journal openings for receiving complementary posts carried by a splice tray such that splice tray is pivotable relative to the splice tray mounting arrangement;
- wherein the splice tray mounting arrangement is capable of receiving and supporting a splice tray when the splice tray hinge part is detached from the splice tray mounting arrangement.

23. The fiber optic splice enclosure according to claim 22 wherein the splice tray mounting arrangement includes a support arm that cantilevers outward from the support frame.

24. The fiber optic splice enclosure of claim 23 wherein the splice tray hinge part includes a spring latch that engages a catch on the support arm when the splice tray hinge part is engaged with the splice tray mounting arrangement.

25. The fiber optic splice enclosure of claim 24 wherein the support frame includes a backboard and the support arm extends substantially perpendicular relative to the backboard and wherein splice tray hinge part rests on an upper surface of the support arm when the splice tray hinge part is engaged with the splice tray mounting arrangement.

26. The fiber optic splice enclosure according to claim 25 wherein the journal openings are arranged in a plane that extends at an angle less than perpendicular relative to the backboard.

27. A fiber optic splice enclosure for housing an interconnection between at least one optical fiber of a feeder cable and at least one optical fiber of a drop cable, the fiber optic splice enclosure comprising:
- a support frame arranged in the enclosure, the support frame including a first side and a second side;
- a first weather tight door carried by the support frame for enclosing the first side of the support frame;
- a bulkhead arranged on the second side of the support frame;
- an enclosed area on the second side of the support frame defined at least in part by the bulkhead;
- a plurality of connector adaptors carried by the bulkhead, the connector adaptors each including a rugged, threaded, sealed connector that extends though the bulkhead to outside the enclosed area for mating with a mating connector carried by a feeder cable.

28. The fiber optic splice enclosure according to claim 27 wherein the enclosure is defined by the bulkhead and a barrier that comprises a removable cover.

29. The fiber optic splice enclosure according to claim 27 wherein the support frame includes an opening that extends between the first and second sides that is arranged within the enclosed area.

30. The fiber optic splice enclosure according to claim 27 further including a plurality of cable attachment elements arranged on the support frame for securing cables to the support frame, at least one of the cable attachment elements being removably attachable to the support frame.

31. The fiber optic splice enclosure of claim 27 further including a splice tray mounting arrangement arranged on the support frame for supporting a plurality of splice trays and a splice tray hinge part snap engageable with the splice tray mounting arrangement so as to be attachable thereto and detachable therefrom, the splice tray hinge part including a plurality of spaced pairs of journal openings for receiving complementary posts carried by a splice tray such that splice tray is pivotable relative to the splice tray mounting arrangement.

32. A fiber optic splice enclosure for housing an interconnection between at least one optical fiber of a feeder cable and at least one optical fiber of a drop cable, the fiber optic splice enclosure comprising:
- a support frame arranged in the enclosure, the support frame having an opening therein;
- a basket for storing slack of a spliced buffer tube transitioning to a splice tray, the basket comprising a separate element that is engageable with the support frame; and
- at least one attachment element that engages upon insertion of at least a portion of the basket into the opening in the support frame and secures the basket in place.

33. The fiber optic splice enclosure of claim 32 wherein the support frame includes a backboard and the basket extends through the backboard.

34. The fiber optic splice enclosure of claim 32 further including a bottom plate including a plurality of grommets for receiving drop or feeder cables, the bottom plate comprising a separate element that is engageable with a lower end of the support frame.

35. The fiber optic splice enclosure of claim 34 further including a grounding plate, the grounding plate comprising a separate element that is mountable on the support frame.

36. The fiber optic splice enclosure of claim 35 wherein the grounding plate is engageable with the bottom plate.

37. The fiber optic splice enclosure of claim 36 wherein the support frame includes a backboard and the grounding plate is engageable with the blackboard.

38. The fiber optic splice enclosure of claim 32 further including a plurality of hinge elements arranged on opposed lateral edges of the support frame for receiving doors and a resiliently flexible snap tab arranged on the support frame for securing a dome on the support frame.

* * * * *